United States Patent
Bessho et al.

(10) Patent No.: US 8,935,105 B2
(45) Date of Patent: Jan. 13, 2015

(54) SIGNAL PROCESSING SYSTEM

(75) Inventors: Takeshi Bessho, Aichi-ken (JP); Makoto Honda, Menlo Park, CA (US)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 458 days.

(21) Appl. No.: 13/330,288

(22) Filed: Dec. 19, 2011

(65) Prior Publication Data

US 2013/0158895 A1  Jun. 20, 2013

(51) Int. Cl.
  *G06F 19/00* (2011.01)
  *G06F 15/00* (2006.01)
  *B60R 21/015* (2006.01)
  *B60N 2/00* (2006.01)
  *G01L 5/00* (2006.01)

(52) U.S. Cl.
  CPC .............. *B60R 21/015* (2013.01); *B60N 2/002* (2013.01); *G01L 5/00* (2013.01)
  USPC ............... 702/41; 702/63; 702/189; 340/438; 340/521; 359/843

(58) Field of Classification Search
  CPC ......... B60R 21/015; B60N 2/002; G01L 5/00
  USPC ...................... 702/41, 63, 189; 340/438, 521; 359/843; 280/5.515, 5.519, 735; 701/45
  See application file for complete search history.

(56) References Cited

U.S. PATENT DOCUMENTS

| | | | | |
|---|---|---|---|---|
| 6,957,591 B2 * | 10/2005 | Takafuji et al. | ........... | 73/862.391 |
| 7,216,895 B2 * | 5/2007 | Hattori et al. | ................. | 280/735 |
| 7,734,061 B2 * | 6/2010 | Breed et al. | ................... | 382/100 |
| 7,796,021 B2 * | 9/2010 | Saban | ........................... | 340/438 |
| 8,044,782 B2 * | 10/2011 | Saban | ........................... | 340/438 |
| 8,342,541 B2 * | 1/2013 | Wurmthaler et al. | ....... | 280/5.515 |
| 2003/0154805 A1 * | 8/2003 | Takafuji et al. | ........... | 73/862.391 |
| 2005/0090958 A1 * | 4/2005 | Hattori et al. | ................... | 701/45 |
| 2009/0027188 A1 * | 1/2009 | Saban | ........................... | 340/521 |
| 2009/0066065 A1 * | 3/2009 | Breed et al. | ................... | 280/735 |
| 2009/0179390 A1 * | 7/2009 | Wurmthaler et al. | ....... | 280/5.519 |
| 2010/0177412 A1 * | 7/2010 | Lee et al. | ...................... | 359/843 |
| 2010/0177413 A1 * | 7/2010 | Lee et al. | ...................... | 359/843 |
| 2010/0302022 A1 * | 12/2010 | Saban | ........................... | 340/459 |

* cited by examiner

*Primary Examiner* — Carol S. W. Tsai
(74) *Attorney, Agent, or Firm* — Patent Law Works LLP

(57) ABSTRACT

A system and method for processing sensor signals is disclosed. The system comprises a sensor array, a multiplexer, a converter, a selection module and a combination module. The sensor array measures a physical parameter in a first dimension on a seat and generates a first set of sensor signals. The sensor array measures the physical parameter in a second dimension on the seat and generates a second set of sensor signals. The multiplexer multiplexes the first set of sensor signals into a first signal stream and the second set of sensor signals into a second signal stream. The converter converts the first signal stream to a first set of digital signals and the second signal stream to a second set of digital signals. The selection module determines a set of first-dimension data and a set of second-dimension data. The combination module forms a set of two-dimensional data.

18 Claims, 22 Drawing Sheets

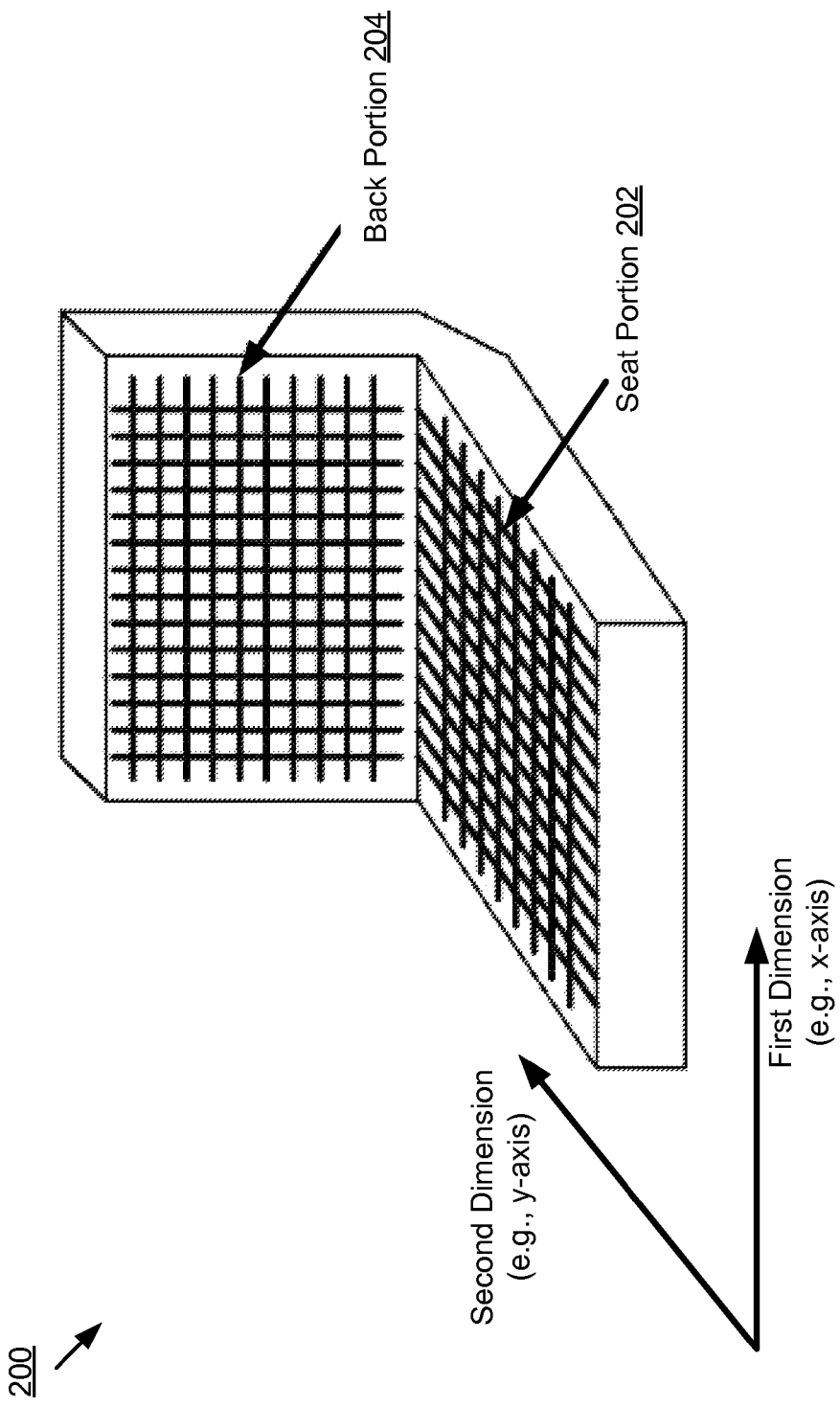

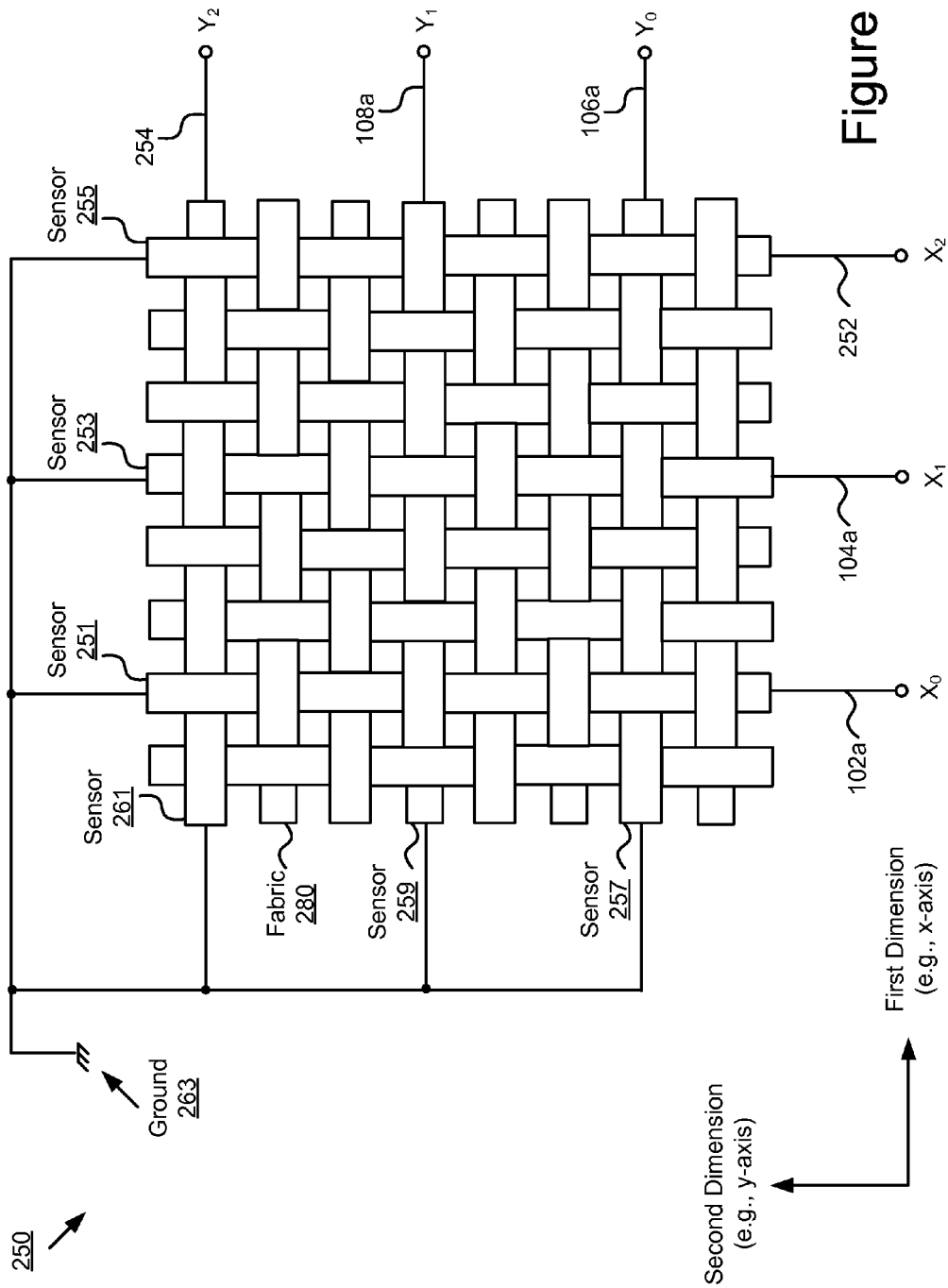

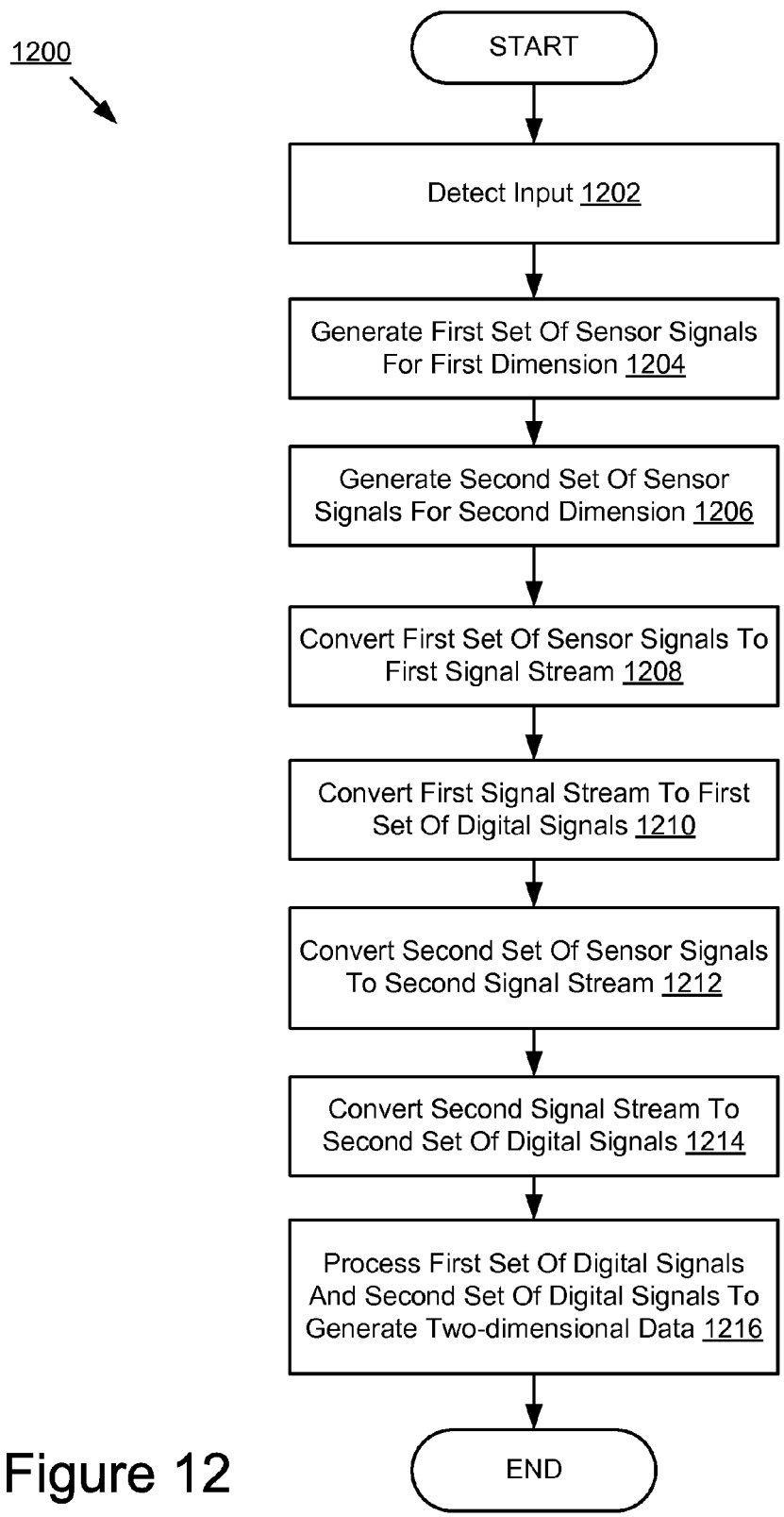

SIGNAL PROCESSING SYSTEM

BACKGROUND

The specification relates to signal processing systems. In particular, the specification relates to a system and method for processing sensor signals generated by a sensor array.

It is desirable for a seat installed in an automobile to include a sensor system for measuring a loading weight on the seat. The sensor system may generate an airbag-triggering signal based at least in part on the measured loading weight for activating the airbag deployment. The sensor system may also detect seat occupancy based at least in part on the measured loading weight. However, existing systems for measuring a loading weight and/or detecting seat occupancy have proven deficient and have numerous problems.

First, existing systems are implemented using expensive materials and devices such as optical fibers, light sources (e.g., light-emitting diodes ("LEDs")) and photo detectors, etc. It is impractical to use the expensive materials and devices to implement a sensor system in a cost-sensitive situation.

Second, existing systems do not detect the degree of seating comfort on the seat. Thus, existing systems fail to automatically adjust and improve the degree of seating comfort for a user.

Third, existing systems fail to generate power themselves and require external power sources to provide power for the systems. If the external power sources fail to supply power, existing systems would be out of service.

SUMMARY OF THE INVENTION

The specification overcomes the deficiencies and limitations of the prior art at least in part by providing a system and method for processing sensor signals. The system comprises a sensor array, a multiplexer, a converter, a selection module and a combination module. The sensor array measures one or more physical parameters in a first dimension on a seat and generates a first set of sensor signals for the first dimension. The sensor array measures the one or more physical parameters in a second dimension on the seat and generates a second set of sensor signals for the second dimension. The multiplexer multiplexes the first set of sensor signals into a first signal stream and the second set of sensor signals into a second signal stream. The converter converts the first signal stream to a first set of digital signals and the second signal stream to a second set of digital signals. The selection module determines a set of first-dimension data from the first set of digital signals and a set of second-dimension data from the second set of digital signals. The combination module combines the set of first-dimension data and the set of second-dimension data to form a set of two-dimensional data.

BRIEF DESCRIPTION OF THE DRAWINGS

The specification is illustrated by way of example, and not by way of limitation in the figures of the accompanying drawings in which like reference numerals are used to refer to similar elements.

FIG. 2A is a block diagram illustrating a seat including one or more sensor arrays according to one embodiment.

FIG. 2B is a block diagram illustrating a structure for a two-dimensional sensor array according to one embodiment.

FIG. 12 is a flowchart illustrating a method for processing sensor signals according to one embodiment.

DETAILED DESCRIPTION OF THE PREFERRED EMBODIMENTS

Figure 1:
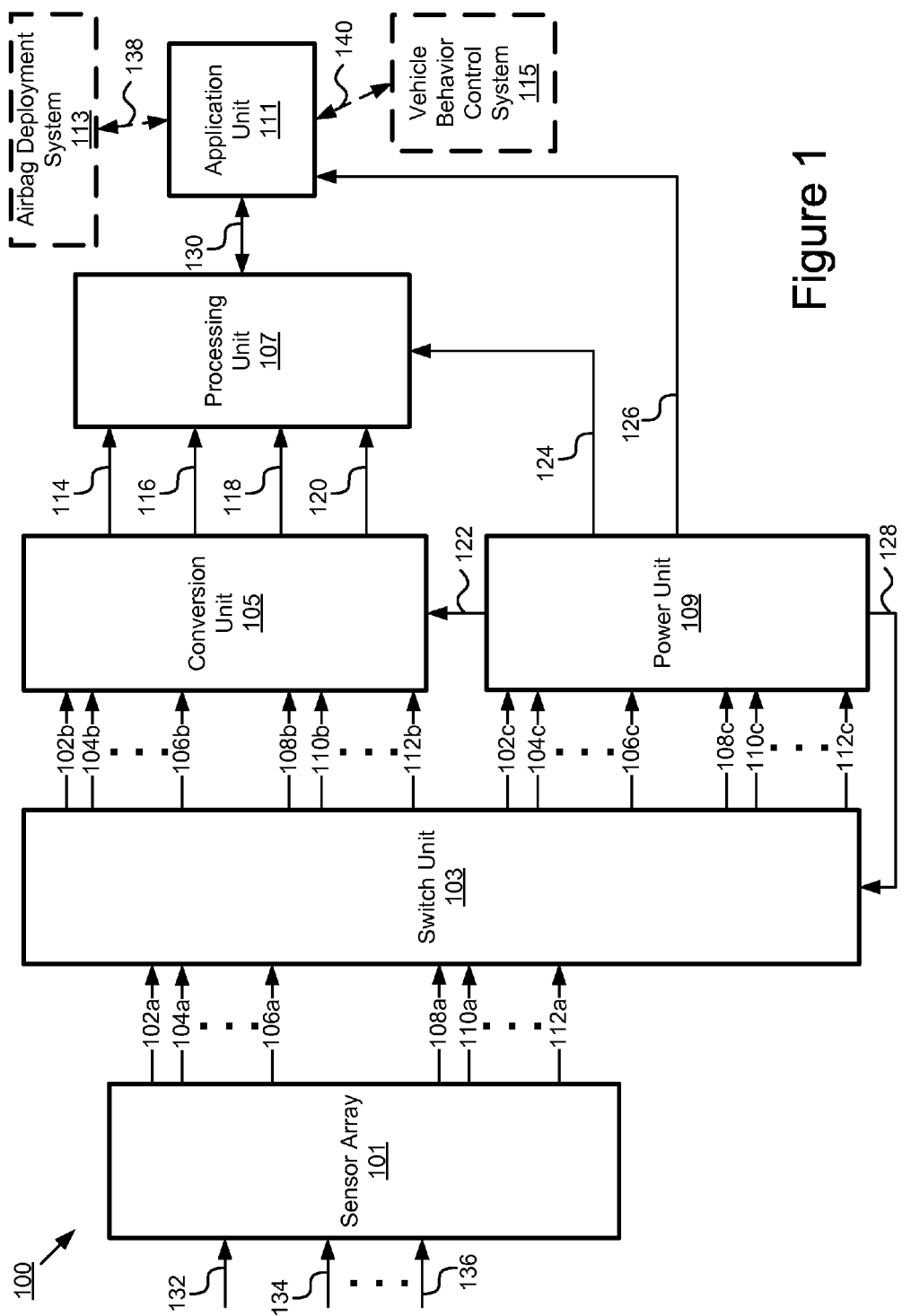
FIG. 1 is a high-level block diagram illustrating a system for processing sensor signals according to one embodiment.

A system and method for processing sensor signals is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for processing sensor signals according to one embodiment. The illustrated system 100 includes a sensor array 101, a switch unit 103, a conversion unit 105, a processing unit 107, a power unit 109 and an application unit 111. These components of the system 100 are communicatively coupled to each other. Although only one sensor array 101, one switch unit 103, one conversion unit 105, one processing unit 107, one power unit 109 and one application unit 111 are illustrated, one skilled in the art will recognize that any number of sensor arrays 101, switch units 103, conversion units 105, processing units 107, power units 109 and application units 111 may be included in the system 100.

In the illustrated embodiment, the system 100 further comprises an airbag deployment system 113 and a vehicle behavior control system 115. The airbag deployment system 113 and the vehicle behavior control system 115 are depicted in dashed lines to indicate that they are optional features of the system 100. The airbag deployment system 113 is communicatively coupled to the application unit 111 via signal line 138. The vehicle behavior control system 115 is communicatively coupled to the application unit 111 via signal line 140.

The sensor array 101 is an array that includes one or more sensors. For example, the sensor array 101 is a piezoelectric polyvinylidene fluoride (PVDF) nanofiber sensor array. In other embodiments, the sensor array 101 is made with any other materials such as glass, polymer, etc. In one embodiment, the sensor array 101 is embedded on the surface of a seat cover. In another embodiment, the sensor array 101 is a two-dimensional array that organizes sensors in a two-dimensional structure. For example, the sensor array 101 is a two-dimensional sensor array weaved into the fabric of a seat surface as illustrated in FIGS. 2A and 2B.

In one embodiment, the sensor array 101 embedded in a seat measures one or more physical parameters (e.g., pressure, strain, force, etc.) applied to the seat surface and generates one or more sensor signals associated with the one or more physical parameters. For example, a sensor array 101 embedded in a seat receives pressure from the seat surface when a user sits on the seat. The sensor array 101 generates one or more sensor signals responsive to the pressure. As another example, if the sensor array 101 is strained because a user sitting on the seat changes the seating position, the sensor array 101 generates one or more sensor signals associated with the strain. One skilled in the art will recognize that the sensor array 101 may measure any other physical parameters such as temperature, sound, etc., and generates one or more sensor signals associated with the other physical parameters.

In the illustrated embodiment shown in FIG. 1, the sensor array 101 receives one or more physical parameters as inputs represented by signal lines 132, 134 and 136. The sensor array 101 generates a first set of sensor signals measuring the one or more physical parameters in a first dimension (e.g., an x-axis) of a two-dimensional domain. The sensor array 101 also generates a second set of sensor signals measuring the one or more physical parameters in a second dimension (e.g., a y-axis) of the two-dimensional domain.

The first set of sensor signals includes one or more sensor signals. In one embodiment, the first set of sensor signals is represented as $(X_0, X_1 \ldots X_{N-1})$ that includes "N" sensor signals. The symbol "N" represents the number of sensor signals included in the first set of sensor signals (e.g., N=1, 2, 8, 256, etc.). Each sensor signal in the first set represents a measurement of the one or more physical parameters at a location of the first dimension. For example, a first sensor signal $X_0$ represents a measurement of the one or more physical parameters at a first location "0" of the first dimension. A second sensor signal $X_1$ represents a measurement of the one or more physical parameters at a second location "1" of the first dimension. Similarly, an $N^{th}$ sensor signal $X_{N-1}$ represents a measurement of the one or more physical parameters at an $N^{th}$ location "N−1" of the first dimension.

The second set of sensor signals includes one or more sensor signals. In one embodiment, the second set of sensor signals is represented as $(Y_0, Y_1 \ldots Y_{L-1})$ that includes "L" sensor signals. The symbol "L" represents the number of sensor signals included in the second set of sensor signals (e.g., L=1, 2, 8, 256, etc.). In one embodiment, the symbol "L" has the same value as the symbol "N." In other embodiments, the symbol "L" has a different value from the symbol "N." Each sensor signal in the second set represents a measurement of the one or more physical parameters at a location of the second dimension. For example, a first sensor signal $Y_0$ represents a measurement of the one or more physical parameters at a first location "0" of the second dimension. Similarly, an $L^{th}$ sensor signal $Y_{L-1}$ represents a measurement of the one or more physical parameters at an $L^{th}$ location "L−1" of the second dimension.

The sensor array 101 sends the first set of sensor signals to the switch unit 103 via a set of signal lines such as signal lines 102a, 104a and 106a. The sensor array 101 sends the second set of sensor signals to the switch unit 103 via a set of signal lines such as signal lines 108a, 110a and 112a. The sensor array 101 is described below in more detail with reference to FIGS. 2A-2B and 3A-3B.

The switch unit 103 is a functional unit that handles transmission of sensor signals from the sensor array 101 to one of the conversion unit 105 and the power unit 109. For example, the switch unit 103 receives a first set of sensor signals $(X_0, X_1 \ldots X_{N-1})$ via signal lines 102a, 104a and 106a and a second set of sensor signals $(Y_0, Y_1 \ldots Y_{L-1})$ via signal lines 108a, 110a and 112a. In one embodiment, the switch unit 103 is configured to deliver the first set of sensor signals to the conversion unit 105 via signal lines 102b, 104b and 106b and the second set of sensor signals to the conversion unit 105 via signal lines 108b, 110b and 112b. In another embodiment, the switch unit 103 is configured to deliver the first set of sensor signals to the power unit 109 via signal lines 102c, 104c and 106c and the second set of sensor signals to the power unit 109 via signal lines 108c, 110c and 112c. The switch unit 103 is described below in more detail with reference to FIG. 4.

The conversion unit 105 is a functional unit that converts a set of sensor signals to a set of digital signals. In one embodiment, the conversion unit 105 receives a first set of sensor signals $(X_0, X_1 \ldots X_{N-1})$ via signal lines 102b, 104b and 106b and multiplexes the first set of sensor signals into a first signal stream. The conversion unit 105 digitizes the first signal stream and generates a first set of digital signals as outputs. The first set of digital signals is associated with the one or more physical parameters measured in the first dimension. The conversion unit 105 also generates a first set of location data associated with the first set of digital signals. The conversion unit 105 sends the first set of digital signals to the processing unit 107 via signal line 114 and the first set of location data to the processing unit 107 via signal line 116.

In one embodiment, the conversion unit 105 receives a second set of sensor signals $(Y_0, Y_1 \ldots Y_{L-1})$ via signal lines 108b, 110b and 112b and multiplexes the second set of sensor signals into a second signal stream. The conversion unit 105 digitizes the second signal stream and generates a second set of digital signals as outputs. The second set of digital signals is associated with the one or more physical parameters measured in the second dimension. The conversion unit 105 also generates a second set of location data associated with the second set of digital signals. The conversion unit 105 sends the second set of digital signals to the processing unit 107 via signal line 120 and the second set of location data to the processing unit 107 via signal line 118. The conversion unit 105 is described below in more detail with reference to FIG. 5.

The processing unit 107 is a functional unit that processes one or more sets of digital signals and generates a set of two-dimensional data. For example, the processing unit 107 is a digital signal processing (DSP) unit. In one embodiment, the processing unit 107 receives a first set of digital signals via signal line 114, a first set of location data via signal line 116, a second set of location data via signal line 118 and a second set of digital signals via signal line 120. The processing unit 107 generates a set of two-dimensional data based at least in part on the first set of digital signals, the first set of location data, the second set of digital signals and the second set of location data.

Figure 9A:
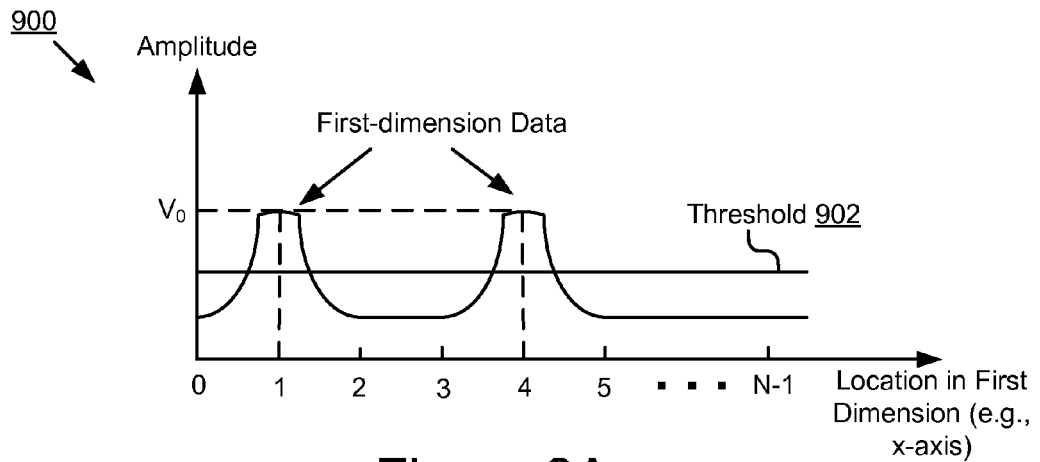
FIG. 9A is a graphical representation illustrating a first set of digital signals in a first dimension according to one embodiment.
Figure 9B:
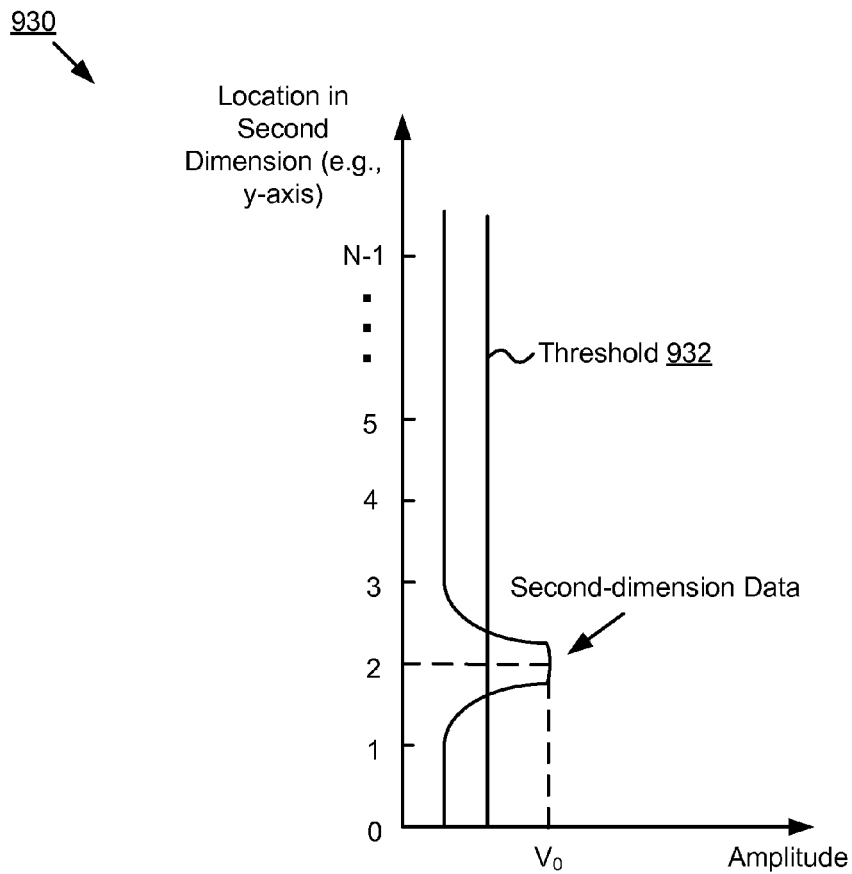
FIG. 9B is a graphical representation illustrating a second set of digital signals in a second dimension according to one embodiment.
Figure 9C:
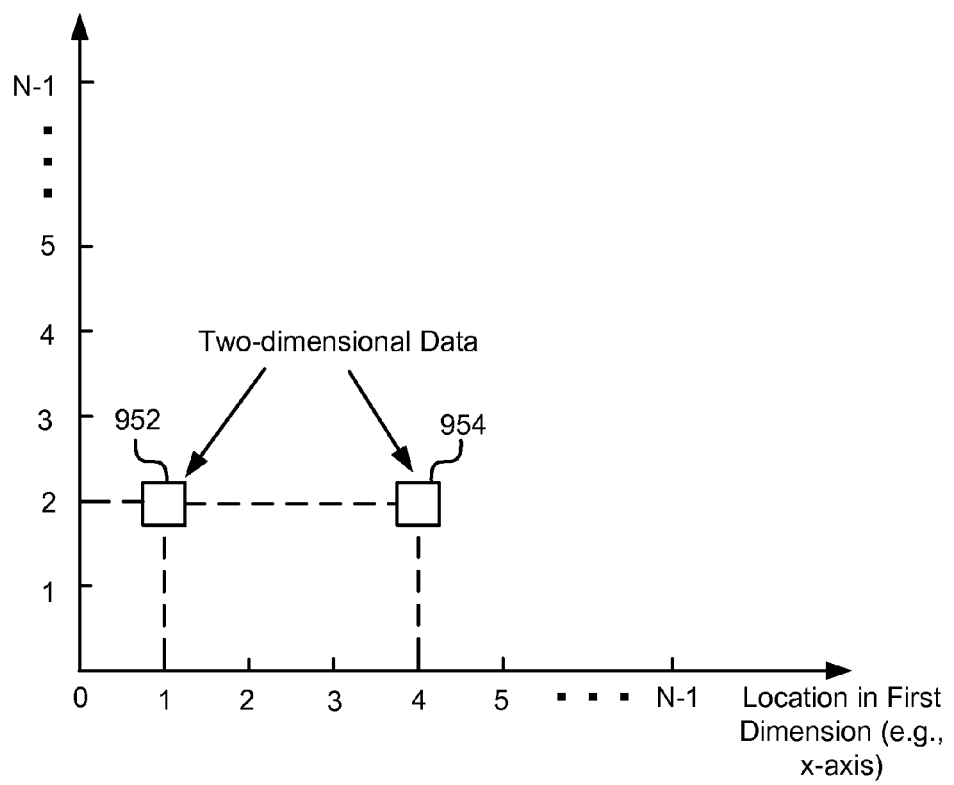
FIG. 9C is a graphical representation illustrating a set of two-dimensional data according to one embodiment.
Figure 10A:
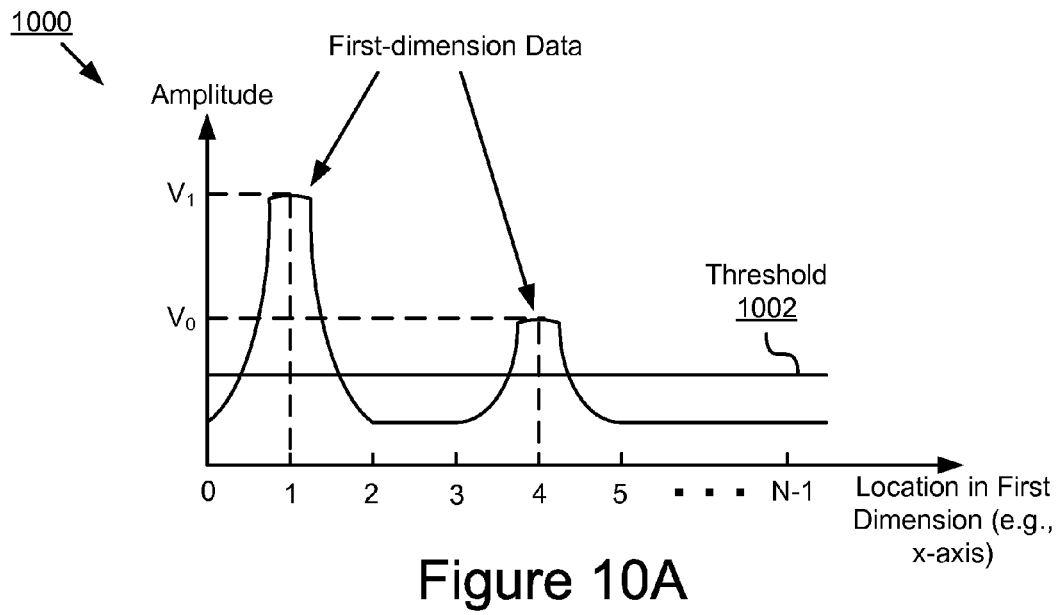
FIG. 10A is a graphical representation illustrating a first set of digital signals in a first dimension according to another embodiment.
Figure 10B:
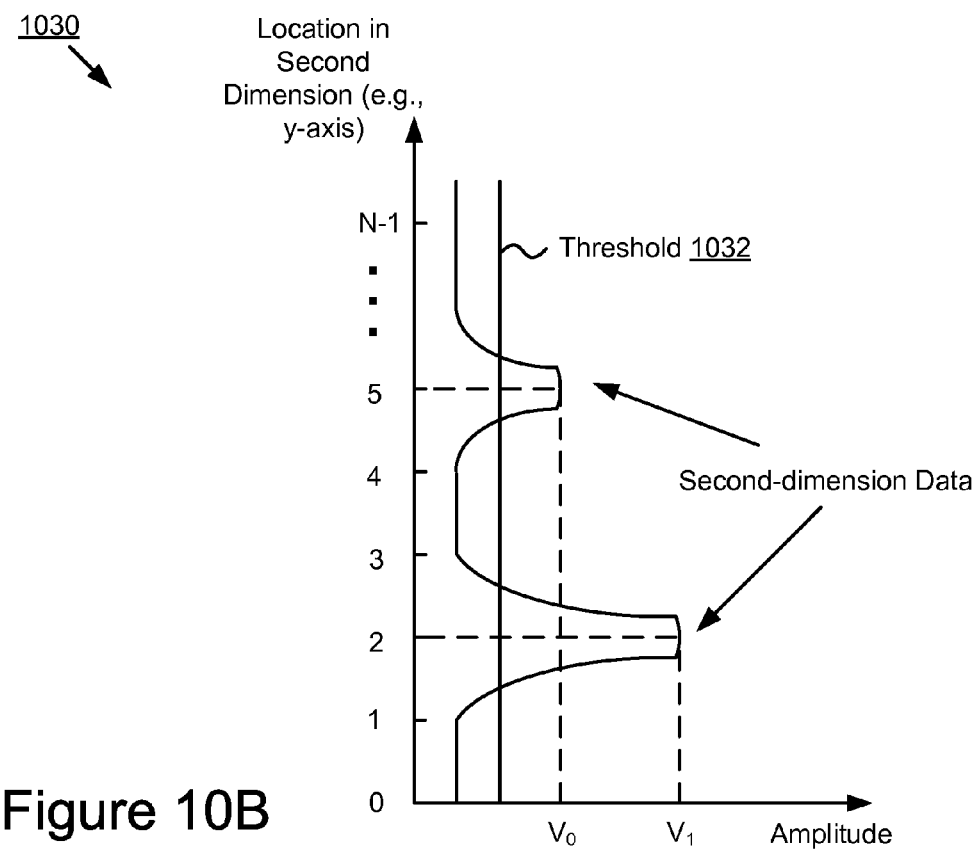
FIG. 10B is a graphical representation illustrating a second set of digital signals in a second dimension according to another embodiment.
Figure 10C:
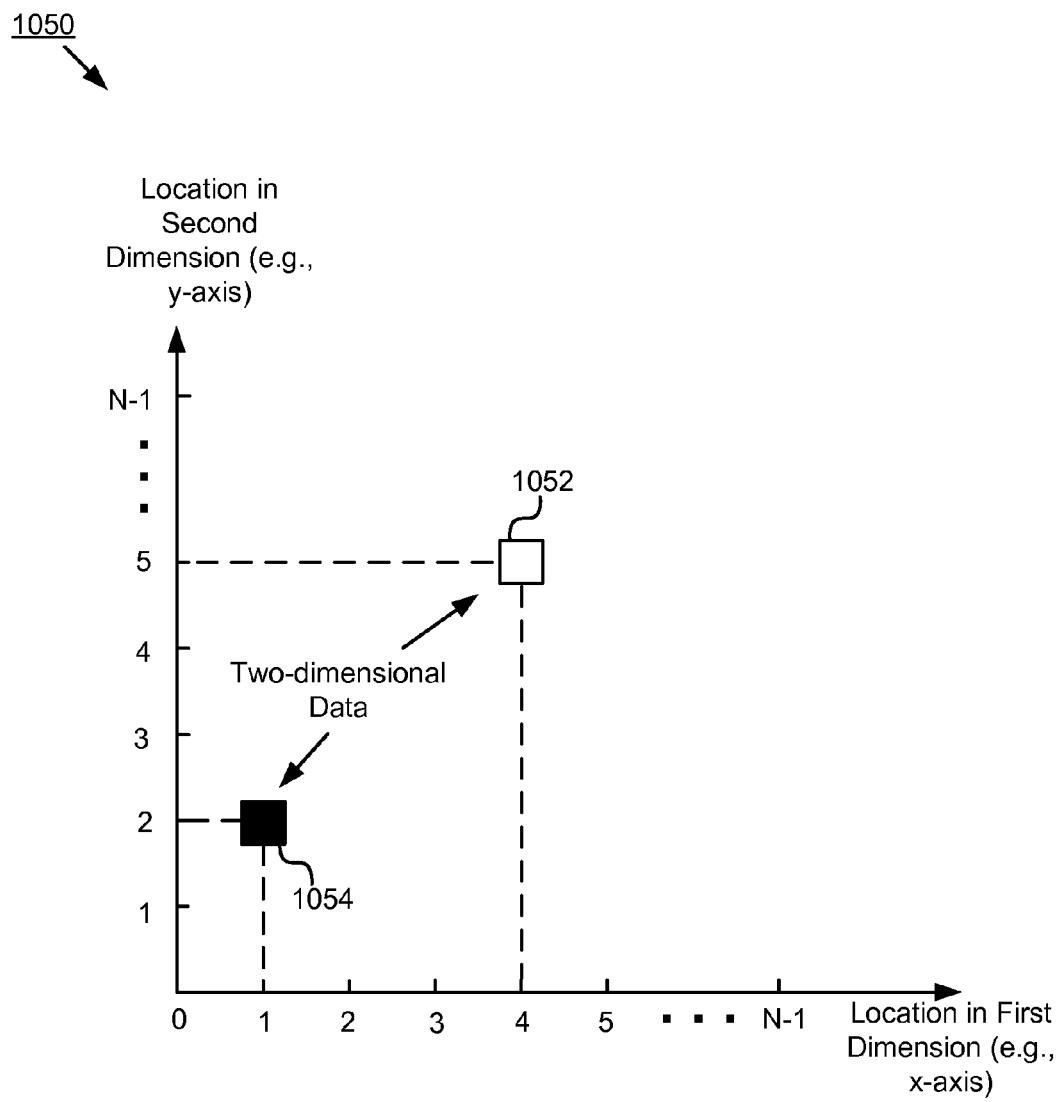
FIG. 10C is a graphical representation illustrating a set of two-dimensional data according to another embodiment.
Figure 11A:
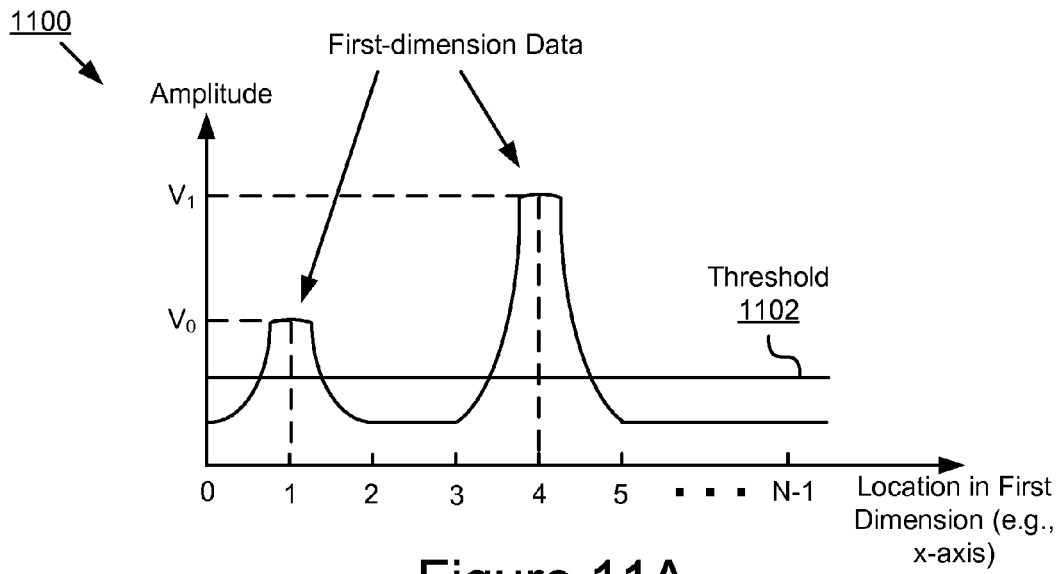
FIG. 11A is a graphical representation illustrating a first set of digital signals in a first dimension according to yet another embodiment.
Figure 11B:
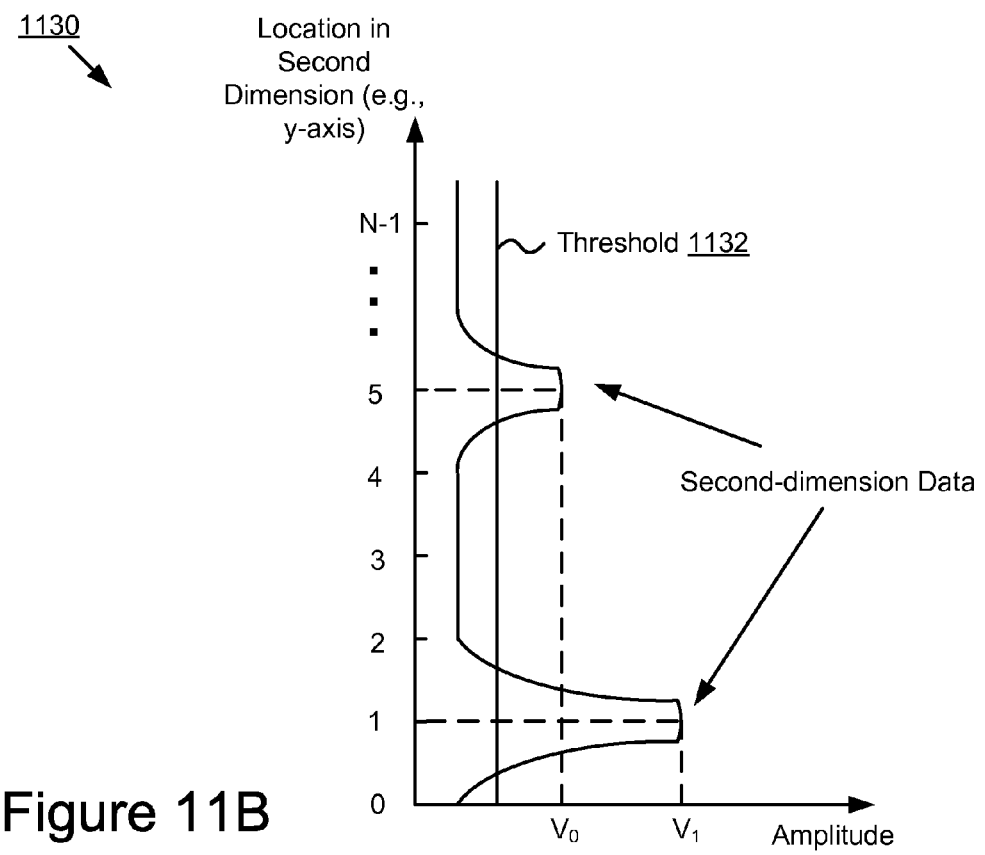
FIG. 11B is a graphical representation illustrating a second set of digital signals in a second dimension according to yet another embodiment.
Figure 11C:
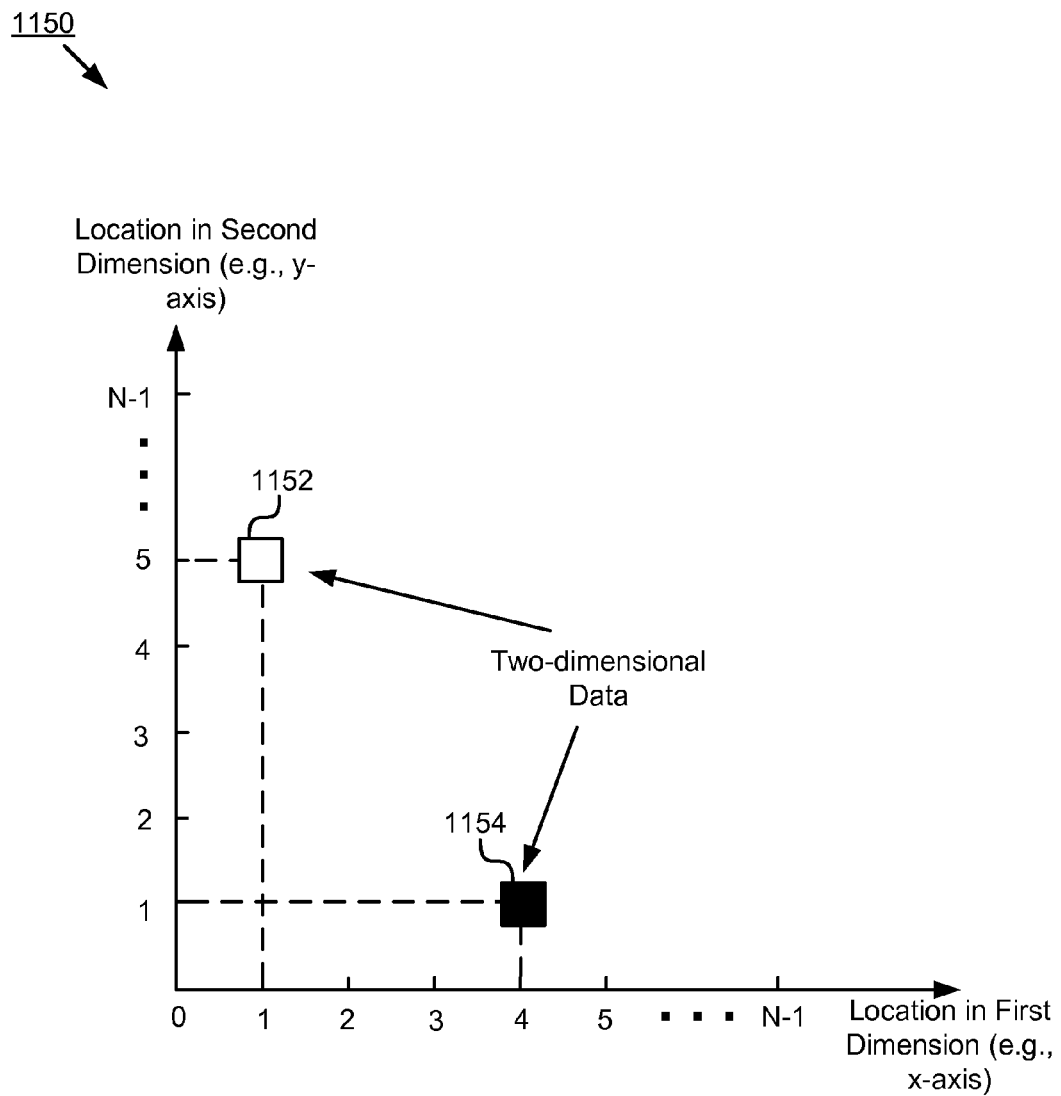
FIG. 11C is a graphical representation illustrating a set of two-dimensional data according to yet another embodiment.

The set of two-dimensional data is a set of data in a two-dimensional domain that comprises a first dimension (e.g., x-axis) and a second dimension (e.g., y-axis). In one embodiment, the set of two-dimensional data is associated with one or more physical parameters applied to a seat. For example, the set of two-dimensional data represents a combined measurement for the one or more physical parameters in a first dimension and in a second dimension. Examples of the set of two-dimensional data are illustrated in FIGS. 9C, 10C and 11C.

The processing unit 107 is communicatively coupled to the application unit 111 via signal line 130. For example, the processing unit 107 sends the set of two-dimensional data to the application unit 111 via signal line 130. The processing unit 107 is described below in more detail with reference to FIGS. 6 and 7.

The power unit 109 is a functional unit that provides power to the system 100. In one embodiment, the power unit 109 receives a first set of sensor signals ($X_0, X_1 \ldots X_{N-1}$) via signal lines 102c, 104c and 106c and a second set of sensor signals ($Y_0, Y_1 \ldots Y_{L-1}$) via signal lines 108c, 110c and 112c. The power unit 109 combines the first set of sensor signals and the second set of sensor signals to generate a power signal. The power unit 109 charges a battery using the power signal.

In one embodiment, the power unit 109 supplies power to one or more of the switch unit 103 via a power supply channel 128, the conversion unit 105 via a power supply channel 122, the processing unit 107 via a power supply channel 124 and the application unit 111 via a power supply channel 126. A power supply channel is a channel for delivering power. For example, a power supply channel is an electrical wire providing power from the power unit 109 to another unit such as the switch unit 103, the conversion unit 105, etc. The power unit 109 is described below in more detail with reference to FIG. 8.

The application unit 111 is a functional unit that applies one or more sets of two-dimensional data to one or more applications. For example, the application unit 111 measures a seating position on a seat and/or a loading weight on the seat based at least in part on one or more sets of two-dimensional data. A seating position is a portion of a seat surface that one or more physical parameters are applied to. A loading weight is a weight rested on the seat. For example, if a user sits on a seat, a seating position is a portion of the seat surface that the user contacts directly and a loading weight is a weight of the user.

In one embodiment, the application unit 111 detects a seat occupancy based at least in part on the seating position and the loading weight. For example, the application unit 111 detects whether a user is sitting on the seat or an object is placed on the seat based at least in part on the seating position and the loading weight. In another embodiment, the application unit 111 detects a degree of seating comfort based at least in part on the seating position and sends a signal representing the degree of seating comfort to the vehicle behavior control system 115 via signal line 140. In yet another embodiment, the application unit 111 generates an airbag-triggering signal based at least in part on the loading weight. The application unit 111 sends the airbag-triggering signal to the airbag deployment system 113 via signal line 138. In one embodiment, the airbag-triggering signal is a multi-level airbag-triggering signal.

The airbag deployment system 113 is a system for monitoring and controlling airbags in a vehicle. For example, the airbag deployment system 113 receives an airbag-triggering signal from the application unit 111 via signal line 138 and turns on one or more airbags associated with the seat. One skilled in the art will recognize that the airbag deployment system 113 may perform other functionality conventional to any airbag deployment system.

The vehicle behavior control system 115 is a system for monitoring and controlling vehicle behaviors. A vehicle behavior includes one of moving track, driving speed and any other vehicle behavior known to one skilled in the art. In one embodiment, the vehicle behavior control system 115 receives a signal indicating a degree of seating comfort on a seat from the application unit 111 via signal line 140. The vehicle behavior control system 115 automatically adjusts the degree of seating comfort for a user based at least in part on the received signal. One skilled in the art will recognize that the vehicle behavior control system 115 may perform other functionality conventional to any vehicle behavior control system.

The system 100 is particularly advantageous to be implemented on an in-vehicle seat because, for example, the system 100 can be implemented at a low cost. For example, the sensor array 101 may be implemented using PVDF nanofibers so that the system 100 does not include expensive materials and devices such as optical fibers, light sources and photo detectors, etc. Furthermore, the system 100 is not only able to generate airbag-triggering signals and detect a seat occupancy, but also capable of detecting a degree of seating comfort so that the degree of seating comfort may be adjusted automatically for a user. Additionally, the system 100 is self-sufficient and does not require any external power sources to supply power. The system 100 includes a power unit 109 that stores the electricity generated by the sensor array 101 and provides power to the other components of the system 100.

Sensor Array

Referring now to FIGS. 2A-3B, the sensor array 101 is shown in more detail. FIG. 2A is a block diagram illustrating a seat 200 according to one embodiment. The seat 200 includes a seat portion 202 and a back portion 204. Each of the seat portion 202 and the back portion 204 is embedded with one or more sensor arrays 101 illustrated as straight lines intersected with each other in FIG. 2A. If a user sits on the seat portion 202 and leans on the back portion 204, the one or more sensor arrays 101 embedded in the seat 200 generate one or more sensor signals responsive to pressure and/or strain applied to the seat 200. A detailed view of a sensor array 101 is illustrated in FIG. 2B.

FIG. 2B is a block diagram illustrating a structure 250 for a two-dimensional sensor array 101 embedded on a seat surface according to one embodiment. In the illustrated embodiment, the sensor array 101 includes a first sensor 251, a second sensor 253 and a third sensor 255 that measure one or more physical parameters in a first dimension (e.g., x-axis) and output a first set of sensor signals ($X_0, X_1, X_2$). One skilled in the art will recognize that the sensor array 101 may include any number of sensors for measuring the one or more physical parameters in the first dimension and generating any number of sensor signals. Additionally, the sensor array 101 includes a fourth sensor 257, a fifth sensor 259 and a sixth sensor 261 that measure the one or more physical parameters in a second dimension (e.g., y-axis) and output a second set of sensor signals ($Y_0, Y_1, Y_2$). One skilled in the art will recognize that the sensor array 101 may include any number of sensors for measuring the one or more physical parameters in the second dimension and generating any number of sensor signals.

In one embodiment, the sensors 251, 253, 255, 257, 259 and 261 are PVDF nanofibers in a strip shape. It will be obvious to one skilled in the art that the sensors 251, 253, 255, 257, 259 and 261 may be made with other materials such as glass, polymer, etc., and in different shapes. The sensors 251, 253, 255, 257, 259 and 261 are weaved with other fabric strips (e.g., a fabric strip 280, etc.) on a seat surface.

In the illustrated embodiment, each sensor 251, 253, 255, 257, 259 and 261 is connected to a ground 263, respectively. Each sensor 251, 253, 255, 257, 259 and 261 is also connected to the switch unit 103, respectively. For example, the sensor 251 is connected to the switch unit 103 via signal line 102a and outputs the sensor signal $X_0$ to the switch unit 103. The sensor 253 is connected to the switch unit 103 via signal line 104a and outputs the sensor signal $X_1$ to the switch unit 103. The sensor 255 is connected to the switch unit 103 via signal line 252 and outputs the sensor signal $X_2$ to the switch unit 103. The sensor 257 is connected to the switch unit 103 via signal line 106a and outputs the sensor signal $Y_0$ to the switch unit 103. The sensor 259 is connected to the switch unit 103 via signal line 108a and outputs the sensor signal $Y_1$ to the switch unit 103. The sensor 261 is connected to the switch unit 103 via signal line 254 and outputs the sensor signal $Y_2$ to the switch unit 103.

Figure 3A:
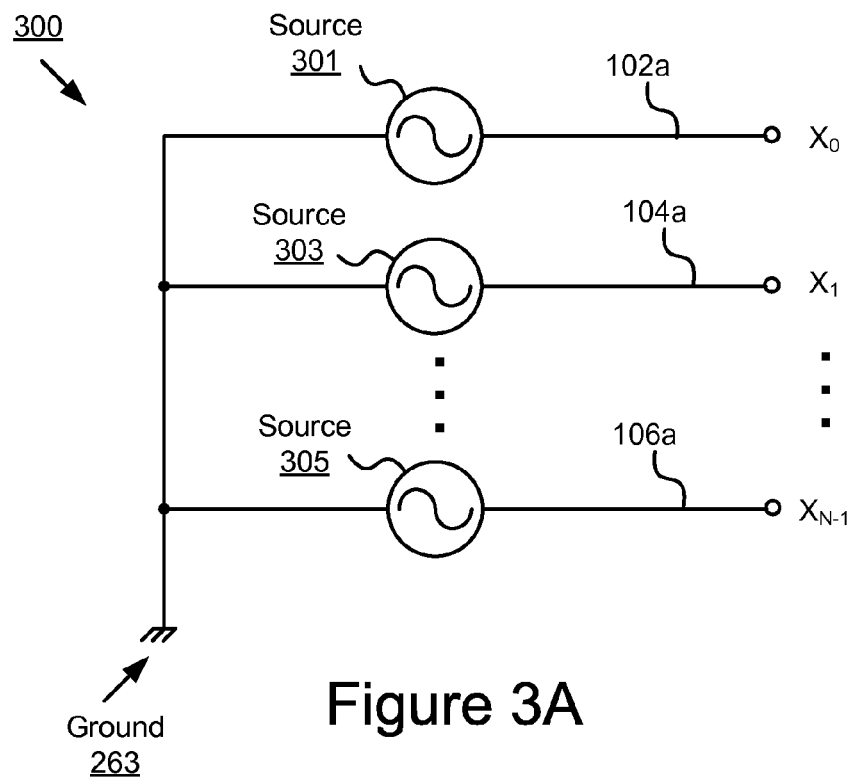
FIG. 3A is a block diagram illustrating a circuit representing one or more sensors in a first dimension of a sensor array according to one embodiment.

FIG. 3A is a block diagram of a circuit 300 representing one or more sensors measuring one or more physical parameters in a first dimension of a two-dimensional domain according to one embodiment. The circuit 300 includes a first source 301, a second source 303 and a third source 305. A source is a representation of a sensor generating a sensor signal. For example, the source 301 is a representation of the sensor 251 when the sensor 251 generates a sensor signal $X_0$. The source 303 is a representation of the sensor 253 when the sensor 253 generates a sensor signal $X_1$. The source 305 is a representation of a sensor when the sensor generates a sensor signal $X_{N-1}$. One skilled in the art will recognize that the circuit 300 may include any number of sources.

In one embodiment, the sources 301, 303 and 305 are alternating current (AC) sources. The amplitudes of the sources 301, 303 and 305 are determined by the one or more physical parameters applied to the seat. The frequencies of the sources 301, 303 and 305 are determined by the vibrating frequencies of the sensors included in the sensor array 101.

The sources 301, 303 and 305 connect to the ground 263, respectively. The source 301 connects to the switch unit 103 via signal line 102a and outputs the sensor signal $X_0$ to the switch unit 103. The source 303 connects to the switch unit 103 via signal line 104a and outputs the sensor signal $X_1$ to the switch unit 103. The source 305 connects to the switch unit 103 via signal line 106a and outputs the sensor signal $X_{N-1}$ to the switch unit 103.

Figure 3B:
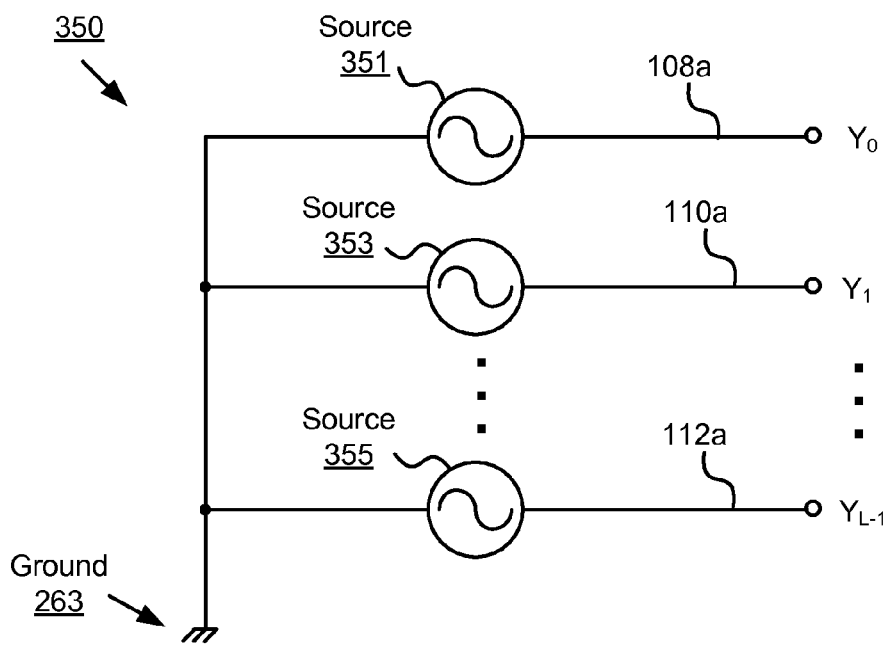
FIG. 3B is a block diagram illustrating a circuit representing one or more sensors in a second dimension of a sensor array according to one embodiment.

FIG. 3B is a block diagram of a circuit 350 representing one or more sensors measuring one or more physical parameters in a second dimension of a two-dimensional domain according to one embodiment. The circuit 350 includes a first source 351, a second source 353 and a third source 355. In one embodiment, the source 351 is a representation of the sensor 257 when the sensor 257 generates a sensor signal $Y_0$. The source 353 is a representation of the sensor 259 when the sensor 259 generates a sensor signal $Y_1$. The source 355 is a representation of a sensor when the sensor generates a sensor signal $Y_{L-1}$. One skilled in the art will recognize that the circuit 350 may include any number of sources.

In one embodiment, the sources 351, 353 and 355 are alternating current (AC) sources. The amplitudes of the sources 351, 353 and 355 are determined by the one or more physical parameters applied to the seat. The frequencies of the sources 351, 353 and 355 are determined by the vibrating frequencies of the sensors included in the sensor array 101.

The sources 351, 353 and 355 connect to the ground 263, respectively. The source 351 connects to the switch unit 103 via signal line 108a and outputs the sensor signal $Y_0$ to the switch unit 103. The source 353 connects to the switch unit 103 via signal line 110a and outputs the sensor signal $Y_1$ to the switch unit 103. The source 355 connects to the switch unit 103 via signal line 112a and outputs the sensor signal $Y_{L-1}$ to the switch unit 103.

Switch Unit

Figure 4:
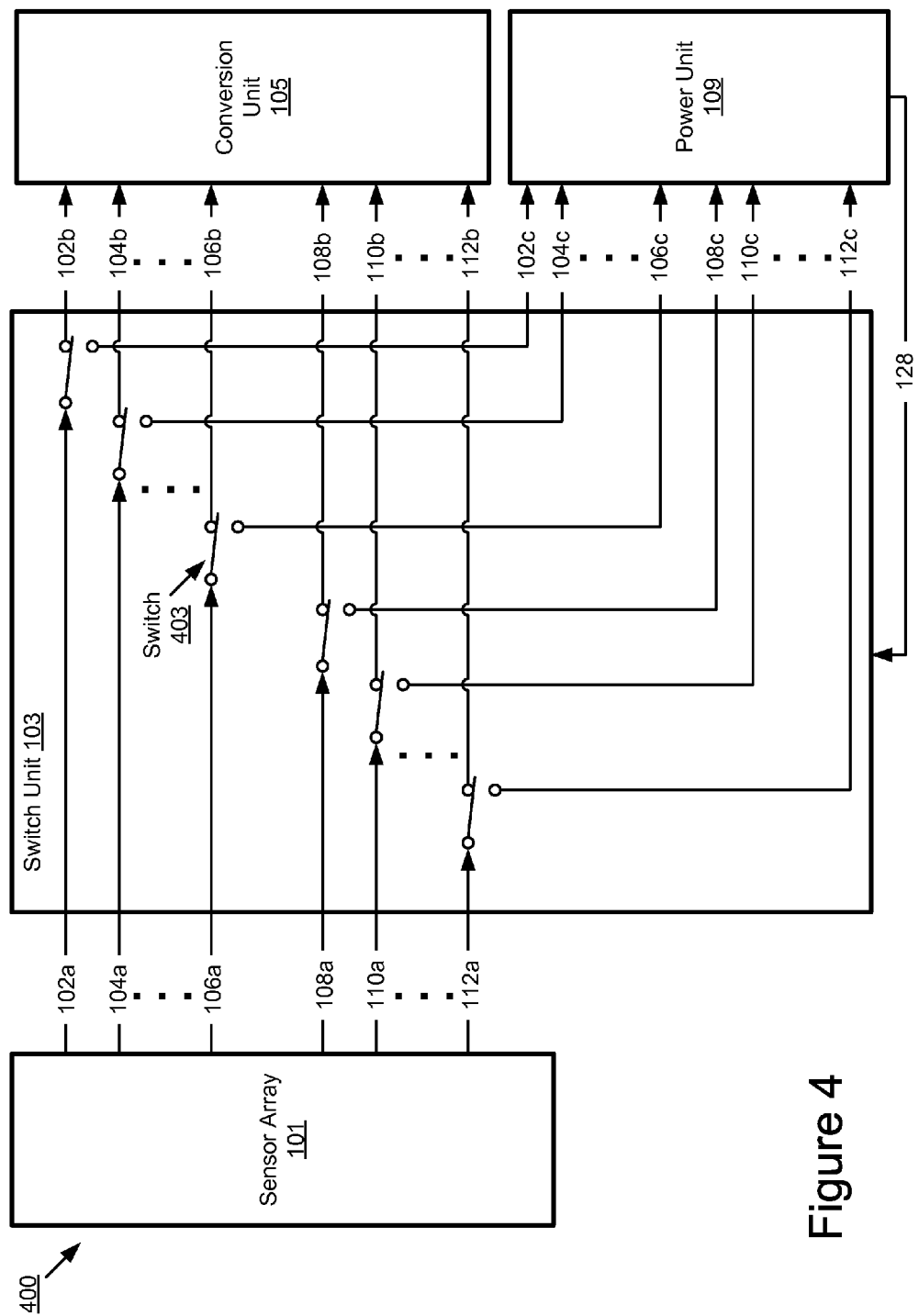
FIG. 4 is a block diagram illustrating a switch unit according to one embodiment.

FIG. 4 is a block diagram 400 illustrating a switch unit 103 according to one embodiment. In one embodiment, the switch unit 103 includes one or more switches 403. The switch 403 is a conventional switch that connects a signal line from the sensor array 101 to one of a signal line connected to the conversion unit 105 and a signal line connected to the power unit 109. For example, the switch 403 connects signal line 106a to one of signal line 106b and signal line 106c. The switch unit 103 receives power from the power unit 109 via the power supply channel 128.

In one embodiment, the switch unit 103 connects the sensor array 101 to the conversion unit 105. For example, the switch unit 103 connects signal line 102a to signal line 102b, signal line 104a to signal line 104b and signal line 106a to signal line 106b. A first set of sensor signals $(X_0, X_1 \ldots X_{N-1})$ is delivered from the sensor array 101 to the conversion unit 105. Similarly, the switch unit 103 connects signal line 108a to signal line 108b, signal line 110a to signal line 110b and signal line 112a to signal line 112b. A second set of sensor signals $(Y_0, Y_1 \ldots Y_{L-1})$ is delivered from the sensor array 101 to the conversion unit 105.

Alternatively, the switch unit 103 connects the sensor array 101 to the power unit 109. For example, the switch unit 103 connects signal line 102a to signal line 102c, signal line 104a to signal line 104c and signal line 106a to signal line 106c. A first set of sensor signals $(X_0, X_1 \ldots X_{N-1})$ is delivered from the sensor array 101 to the power unit 109. Similarly, the switch unit 103 connects signal line 108a to signal line 108c, signal line 110a to signal line 110c and signal line 112a to signal line 112c. A second set of sensor signals $(Y_0, Y_1 \ldots Y_{L-1})$ is delivered from the sensor array 101 to the power unit 109.

Conversion Unit

Figure 5:
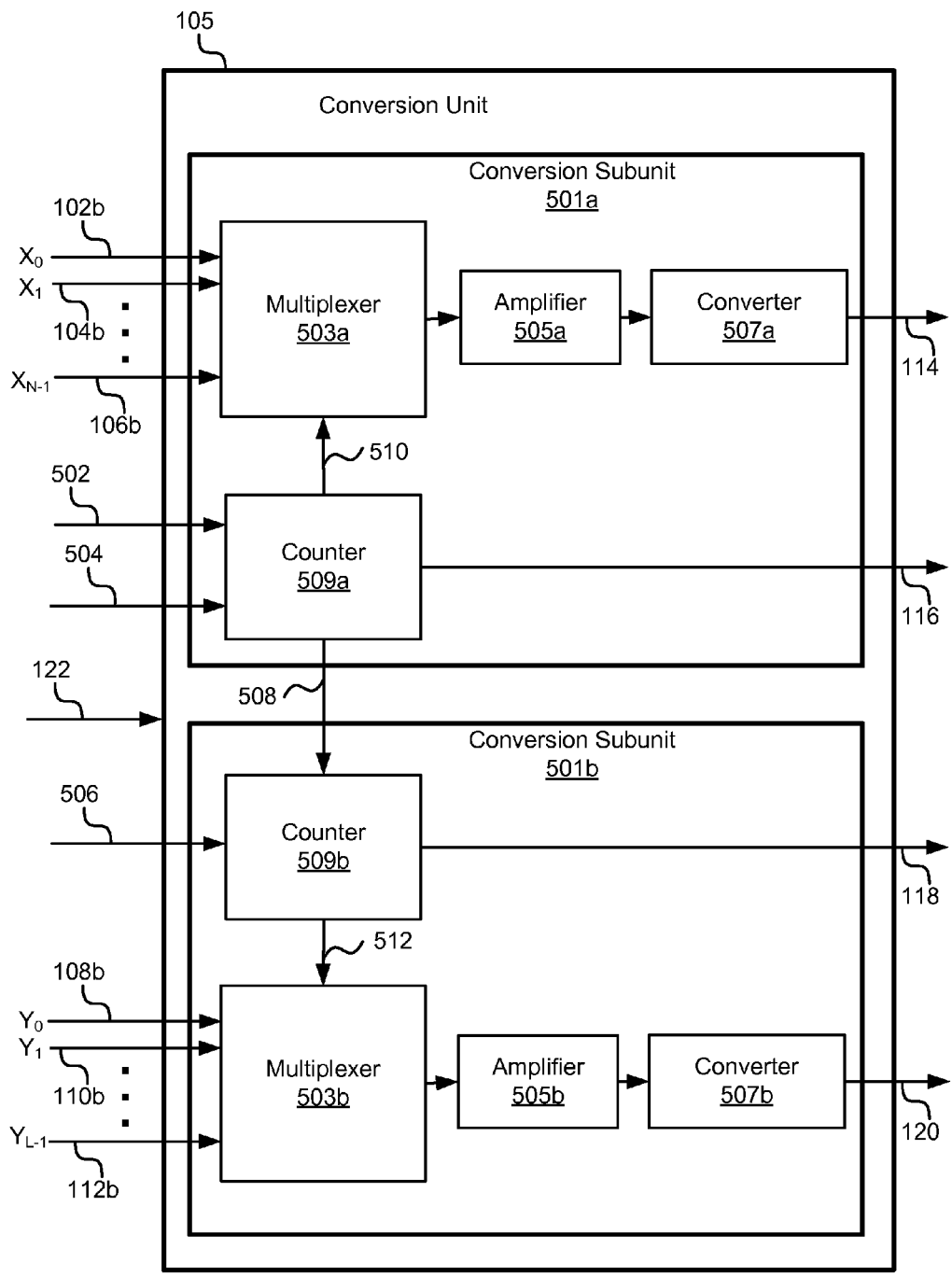
FIG. 5 is a block diagram illustrating a conversion unit according to one embodiment.

FIG. 5 is a block diagram illustrating a conversion unit 105 according to one embodiment. The conversion unit 105 includes a first conversion subunit 501a and a second conversion subunit 501b. The conversion unit 105 receives power from the power unit 109 via the power supply channel 122. The conversion subunit 501a is a functional unit that performs signal conversions. For example, the conversion subunit 501a converts a first set of sensor signals $(X_0, X_1 \ldots X_{N-1})$ to a first set of digital signals. The conversion subunit 501a includes a multiplexer 503a, an amplifier 505a, a converter 507a and a counter 509a. These components of the conversion subunit 501a are communicatively coupled to each other.

The multiplexer 503a is any device that multiplexes a set of parallel inputs to a single serial output. For example, the multiplexer 503a is a time-division multiplexer that converts a set of inputs to a single time-division multiplexed output. In one embodiment, the multiplexer 503a receives a first set of sensor signals $(X_0, X_1 \ldots X_{N-1})$ from the switch unit 103 and generates a first signal stream as described below. A signal stream is a stream of signals. In one embodiment, the first signal stream includes all the sensor signals $(X_0, X_1 \ldots X_{N-1})$ that are sent to the amplifier 505a one by one.

In one embodiment, the multiplexer 503a receives a selection signal from the counter 509a via signal line 510. A selection signal is a signal indicating which sensor signal to be selected from a set of sensor signals. In one embodiment, a selection signal includes location data indicating that a sensor signal associated with the location data is selected. For example, a selection signal includes location data "1" indicating that the sensor signal $X_1$ associated with the location data "1" is selected. The multiplexer 503a selects a sensor signal based at least in part on the location data and inserts the selected sensor signal into the first signal stream. By selecting each sensor signal included in the first set of sensor signals and inserting the selected sensor signal into the first signal stream, the multiplexer 503a converts the first set of sensor signals to the first signal stream.

For example, the multiplexer 503a receives a first selection signal including location data "0" from the counter 509a and selects a first sensor signal $X_0$ from the first set of sensor signals. The multiplexer 503a inserts the sensor signal $X_0$ into the first signal stream. Next, the multiplexer 503a receives a second selection signal including location data "1" and selects a second sensor signal $X_1$ from the first set of sensor signals. The multiplexer 503a inserts the sensor signal $X_1$ into the first signal stream. By performing similar operations as described above, the multiplexer 503a inserts all the sensor signals ($X_0, X_1 \ldots X_{N-1}$) into the first signal stream. The multiplexer 503a sends the first signal stream to the amplifier 505a.

The amplifier 505a is any device for amplifying a signal. For example, the amplifier 505a is an electronic amplifier (e.g., a power amplifier) that amplifies the power of a signal. In one embodiment, the amplifier 505a receives a first signal stream from the multiplexer 503a and amplifies each sensor signal included in the first signal stream. The amplifier 505a sends the amplified first signal stream to the converter 507a.

The converter 507a is any device for digitizing an analog signal. For example, the converter 507a is an analog-to-digital (AD) converter. In one embodiment, the converter 507a receives a first signal stream from the amplifier 505a and converts each sensor signal included in the first signal stream to a digital signal. The converter 507a generates a first set of digital signals by digitizing each sensor signal included in the first signal stream. The converter 507a sends the first set of digital signals to the processing unit 107 via signal line 114.

The counter 509a is a module that generates numbers by performing modular arithmetic. For example, the counter 509a has an arithmetic modulo "N" and outputs a number with a value between "0" and "N−1" in every one or more clock cycles. In one embodiment, the counter 509a receives a clock signal provided by the system 100 via signal line 502. The counter 509a receives an enabling signal provided by the system 100 via signal line 504. The enabling signal enables the counter 509a to provide the functionality described herein.

In one embodiment, the counter 509a generates a number having a value between "0" and "N−1" in each clock cycle and includes the number as location data in a selection signal. The counter 509a sends the selection signal to the multiplexer 503a so that a sensor signal associated with the location data is selected. For example, in a first clock cycle, the counter 509a generates the number "0" and includes the number "0" as location data in a first selection signal. The counter 509a sends the first selection signal to the multiplexer 503a. In a second clock cycle, the counter 509a generates the number "1" and includes the number "1" as location data in a second selection signal. The counter 509a sends the second selection signal to the multiplexer 503a. Similarly, in an $N^{th}$ clock cycle, the counter 509a generates the number "N−1" and includes the number "N−1" in an $N^{th}$ selection signal. The counter 509a sends the $N^{th}$ selection signal to the multiplexer 503a. Next, the counter 509a will repeat the generation from the number "0" to the number "N−1" again, because the counter 509a performs arithmetic operations with a modulo "N."

In one embodiment, the counter 509a generates a first set of location data that includes the location data in each selection signal. The counter 509a sends the first set of location data to the processing unit 107 by outputting the location data included in each selection signal to the processing unit 107 via signal line 116. The first set of location data is associated with the first set of digital signals. The first set of location data includes data describing a location in the first dimension for each digital signal included in the first set of digital signals.

In one embodiment, the counter 509a generates an enabling signal that enables the counter 509b to provide the functionality similar to the counter 509a. The counter 509a sends the enabling signal to the counter 509b via signal line 508.

The conversion subunit 501b includes a multiplexer 503b, an amplifier 505b, a converter 507b and a counter 509b. Like reference numerals are used to refer to similar elements. The descriptions for similar elements will not be repeated here.

In one embodiment, the multiplexer 503b receives a second set of sensor signals ($Y_0, Y_1 \ldots Y_{L-1}$) from the switch unit 103. The multiplexer 503b generates a second signal stream from the second sensor signals by performing operations similar to those described above with reference to the multiplexer 503a. In one embodiment, the second signal stream includes all the sensor signals ($Y_0, Y_1 \ldots Y_{L-1}$) that are transmitted to the amplifier 505b one by one. The amplifier 505b amplifies each sensor signal included in the second signal stream and sends the amplified second signal stream to the converter 507b. The converter 507b generates a second set of digital signals by converting each sensor signal included in the second signal stream to a digital signal. The converter 507b sends the second set of digital signals to the processing unit 107 via signal line 120.

In one embodiment, the counter 509b has an arithmetic modulo "L" and outputs a number with a value between "0" and "L−1." The counter 509b generates a selection signal including the number as location data so that a sensor signal associated with the location data is selected from the second set of sensor signals. The counter 509b sends the selection signal to the multiplexer 503b via signal line 512. The counter 509b also outputs a second set of location data to the processing unit 107 via signal line 118. The second set of location data includes data describing a location in the second dimension for each digital signal included in the second set of digital signals. The counter 509b receives an enabling signal from the counter 509a via signal line 508. The counter 509b receives a clock signal provided by the system 100 via signal line 506.

In other embodiments, the conversion unit 105 only includes a single conversion subunit 501. The conversion subunit 501 includes a multiplexer 503, an amplifier 505, a converter 507 and a counter 509. The multiplexer 503 converts a first set of sensor signals ($X_0, X_1 \ldots X_{N-1}$) to a first signal stream. The amplifier 505 amplifies the first signal stream and the converter 507 converts the first signal stream to a first set of digital signals. The counter 509 generates a first set of location data associated with the first set of digital signals. The multiplexer 503 also converts a second set of sensor signals ($Y_0, Y_1 \ldots Y_{L-1}$) to a second signal stream. The amplifier 505 amplifies the second signal stream. The converter 507 converts the second signal stream to a second set of digital signals. The counter 509 generates a second set of location data associated with the second set of digital signals.

Processing Unit

Figure 6:
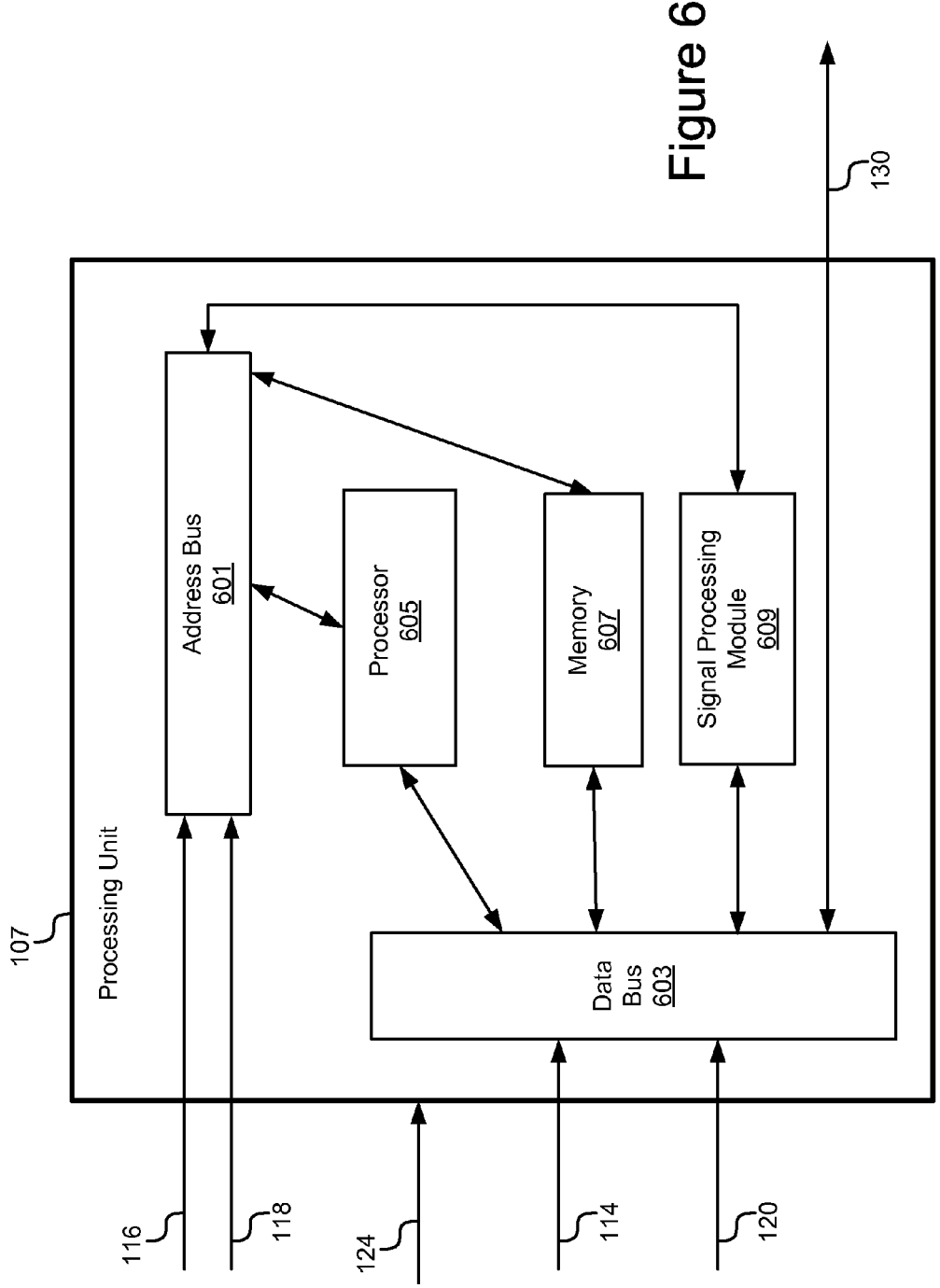
FIG. 6 is a block diagram illustrating a processing unit according to one embodiment.

FIG. 6 is a block diagram illustrating a processing unit 107 according to one embodiment. The processing unit 107 includes an address bus 601, a data bus 603, a processor 605, a memory 607 and a signal processing module 609. These components of the processing unit 107 are communicatively coupled to each other. The processing unit 107 receives power from the power unit 109 via the power supply channel 124.

The address bus 601 is a computer bus for specifying a memory location in the memory 607. In one embodiment, the address bus 601 receives location data specifying a location in a first dimension via signal line 116. The location data is associated with a digital signal included in a first set of digital signals. The address bus 601 generates an address specifying a memory location based at least in part on the received location data in the first dimension. The memory location is used to store the digital signal associated with the location data. The address bus 601 sends the address to one or more of the processor 605, the memory 607 and the signal processing module 609.

In one embodiment, the address bus 601 receives location data specifying a location in a second dimension via signal line 118. The location data is associated with a digital signal included in a second set of digital signals. The address bus 601 generates an address specifying a memory location based at least in part on the location data in the second dimension. The memory location is used to store the digital signal included in the second set of digital signals. The address bus 601 sends the address to one or more of the processor 605, the memory 607 and the signal processing module 609.

The data bus 603 is a computer bus for data communication. In one embodiment, the data bus 603 receives a first set of digital signals from the conversion unit 105 via signal line 114 and sends the first set of digital signals to the signal processing module 609. In another embodiment, the data bus 603 receives a second set of digital signals from the conversion unit 105 via signal line 120 and sends the second set of digital signals to the signal processing module 609. In yet another embodiment, the data bus 603 retrieves data from a memory location in the memory 607 specified by the address bus 601 and sends the data to the signal processing module 609. In one embodiment, the data bus 603 receives data from the signal processing module 609 and stores the data in a memory location specified by the address bus 601. In another embodiment, the data bus 603 receives a set of two-dimensional data from the signal processing module 609 and sends the set of two-dimensional data to the application unit 111 via signal line 130.

The processor 605 comprises an arithmetic logic unit, a microprocessor, a general purpose controller or some other processor array to perform computations, retrieve data stored on the memory 607, etc. The processor 605 processes data signals and may comprise various computing architectures including a complex instruction set computer (CISC) architecture, a reduced instruction set computer (RISC) architecture, or an architecture implementing a combination of instruction sets. Although only a single processor is shown in FIG. 6, multiple processors may be included.

The memory 607 stores instructions and/or data that may be executed by the processor 605. The memory 607 is coupled to the data bus 603 for communication with the processor 605. The instructions and/or data may comprise code for performing any and/or all of the techniques described herein. The memory 607 may be a dynamic random access memory (DRAM) device, a static random access memory (SRAM) device, flash memory or some other memory device known in the art. In one embodiment, the memory 607 also includes a non-volatile memory or similar permanent storage device and media such as a hard disk drive, a floppy disk drive, a flash memory device, or some other mass storage device known in the art for storing information on a more permanent basis.

In one embodiment, the memory 607 stores a first set of digital signals in memory locations that are specified by the address bus 601. In another embodiment, the memory 607 stores a second set of digital signals in memory locations that are specified by the address bus 601. In yet another embodiment, the memory 607 stores a set of two-dimensional data. One skilled in the art will recognize that the memory 607 may store any other data for providing the functionality described herein.

The signal processing module 609 is code and routines that, when executed by the processor 605, processes signals received from the conversion unit 105. In one embodiment, the signal processing module 609 is stored in the memory 607. In another embodiment, the signal processing module 609 is stored in an on-chip memory embedded in the processor 605. In yet another embodiment, the signal processing module 609 is implemented using a field-programmable gate array (FPGA). The signal processing module 609 is described below in more detail with reference to FIG. 7.

Figure 7:
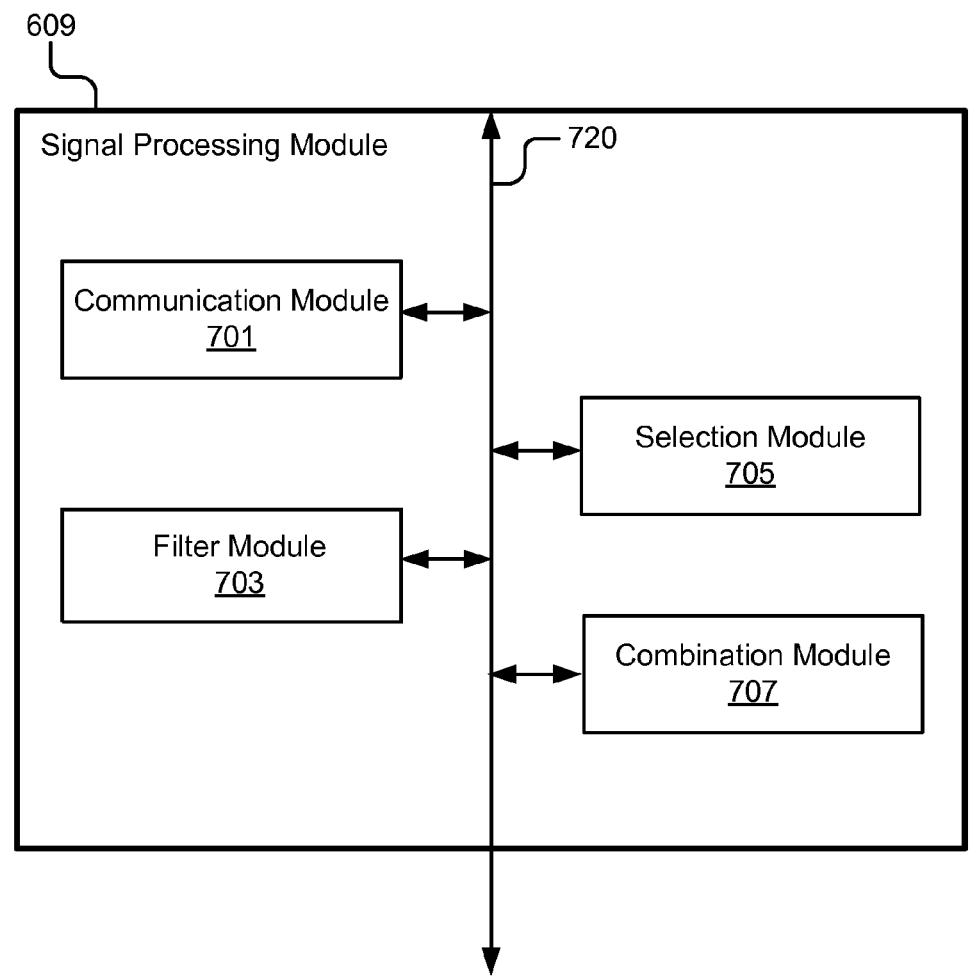
FIG. 7 is a block diagram illustrating a signal processing module according to one embodiment.

FIG. 7 is a block diagram illustrating a signal processing module 609 according to one embodiment. The signal processing module 609 comprises a communication module 701, a filter module 703, a selection module 705 and a combination module 707. The components of the signal processing module 609 are communicatively coupled to a bus 720. In one embodiment, the bus 720 is a portion of the data bus 603.

The communication module 701 is code and routines that, when executed by the processor 605, handles communication between components of the signal processing module 609 and other components in the processing unit 107. For example, the communication module 701 retrieves a first set of digital signals associated with a first set of sensor signals $(X_0, X_1 \ldots X_{N-1})$ from the memory 607 via the data bus 603 and sends the first set of digital signals to the filter module 703. In one embodiment, the communication module 701 handles communication between components of the signal processing module 609. For example, the communication module 701 receives filtered digital signals from the filter module 703 and delivers the filtered digital signals to the selection module 705.

In one embodiment, the communication module 701 receives a first set of digital signals associated with a first set of sensor signals $(X_0, X_1 \ldots X_{N-1})$ from the conversion unit 105 via the data bus 603. The communication module 701 stores each digital signal included in the first set of digital signals in a memory location specified by the address bus 601. In another embodiment, the communication module 701 receives a second set of digital signals associated with a second set of sensor signals $(Y_0, Y_1 \ldots Y_{L-1})$ from the conversion unit 105 via the data bus 603. The communication module 701 stores each digital signal included in the second set of digital signals in a memory location specified by the address bus 601.

The filter module 703 is code and routines that, when executed by the processor 605, filters one or more signals. For example, the filter module 703 is a low-pass digital filter for filtering digital signals. In one embodiment, the filter module 703 receives a first set of digital signals associated with a first set of sensor signals $(X_0, X_1 \ldots X_{N-1})$ from the communication module 701. The filter module 703 filters the first set of digital signals to remove any outlier and/or noise from the first set of digital signals. Examples of a graphical representation of the first set of filtered digital signals are shown in FIGS. 9A, 10A and 11A. The filter module 703 sends the first set of filtered digital signals to the selection module 705.

In one embodiment, the filter module 703 receives a second set of digital signals associated with a second set of sensor signals $(Y_0, Y_1 \ldots Y_{L-1})$ from the communication module 701. The filter module 703 filters the second set of digital signals to remove any outlier and/or noise from the second set of digital signals. Examples of a graphical representation of the second set of filtered digital signals are shown in FIGS. 9B, 10B and 11B. The filter module 703 sends the second set of filtered digital signals to the selection module 705.

The selection module 705 is code and routines that, when executed by the processor 605, selects data from a set of digital signals. In one embodiment, the selection module 705 receives a first set of digital signals associated with a first set of sensor signals $(X_0, X_1 \ldots X_{N-1})$ from the filter module 703. The selection module 705 selects a set of first-dimension data from the first set of digital signals as described below.

A set of first-dimension data is a set of data representing one or more digital signals selected in a first dimension. For example, a set of first-dimension data includes a plurality of digital signals selected from the first set of digital signals that have amplitudes greater than any other remaining digital signals in the first set. As another example, a set of first-dimension data includes a plurality of digital signals whose amplitudes are greater than a threshold. In one embodiment, the threshold is set by an administrator of the system 100. Examples of a set of first-dimension data are shown in FIGS. 9A, 10A and 11A.

In one embodiment, the selection module 705 selects M maximal digital signals from the first set of digital signals as a set of first-dimension data. The symbol "M" represents the number of digital signals selected by the selection module 705 (e.g., M=1, 2, 3 . . . ). The selected digital signals in the set of first-dimension data have greater amplitudes than the remaining digital signals in the first set. In another embodiment, the selection module 705 selects all the digital signals whose amplitudes are greater than a threshold from the first set of digital signals as a set of first-dimension data. In other embodiments, the selection module 705 selects a set of first-dimension data using other methods such as time-domain averaging, normalization by a mean value, etc.

The selection module 705 determines location data associated with the set of first-dimension data. For example, if the digital signals associated with sensor signals $X_2$, $X_5$, $X_7$ are selected as the set of first-dimension data, the selection module 705 determines the associated location data for the set of first-dimension data as "2," "5" and "7." In one embodiment, the selection module 705 also determines timestamp data associated with the set of first-dimension data. In one embodiment, the timestamp data represents the time when the set of first-dimension data was generated. In another embodiment, the timestamp data represents the time when the sensor array 101 generated the first set of sensor signals $(X_0, X_1 \ldots X_{N-1})$.

The selection module 705 stores the set of first-dimension data, the associated location data and the associated timestamp data in the memory 607. In one embodiment, the selection module 705 sends the set of first-dimension data, the associated location data and the associated timestamp data to the combination module 707.

In one embodiment, the selection module 705 receives a second set of digital signals associated with a second set of sensor signals $(Y_0, Y_1 \ldots Y_{L-1})$ from the filter module 703. The selection module 705 selects a set of second-dimension data from the second set of digital signals by performing operations similar to those described above for the selection of the set of first-dimension data.

A set of second-dimension data is a set of data representing one or more digital signals selected in a second dimension. In one embodiment, the set of second-dimension data is similar to the set of first-dimension data, except that the set of second-dimension data is associated with a second dimension (e.g., y-axis) while the set of first-dimension data is associated with a first dimension (e.g., x-axis). For example, a set of second-dimension data includes a plurality of digital signals selected from the second set of digital signals whose amplitudes are greater than a threshold. Examples of a set of second-dimension data are shown in FIGS. 9B, 10B and 11B.

The selection module 705 determines location data and timestamp data associated with the set of second-dimension data. The selection module 705 stores the set of second-dimension data, the associated location data and the associated timestamp data in the memory 607. In one embodiment, the selection module 705 sends the set of second-dimension data, the associated location data and the associated timestamp data to the combination module 707.

The combination module 707 is code and routines that, when executed by the processor 605, generates a set of two-dimensional data. In one embodiment, the combination module 707 receives a set of first-dimension data, location data and timestamp data associated with the set of first-dimension data from the selection module 705. The combination module 707 also receives a set of second-dimension data, location data and timestamp data associated with the set of second-dimension data from the selection module 705. The combination module 707 is configured to combine the set of first-dimension data and the set of second-dimension data to form a set of two-dimensional data as described below. For example, the combination module 707 generates the set of two-dimensional data based at least in part on the set of first-dimension data, the location data associated with the set of first-dimension data, the set of second-dimension data and the location data associated with the set of second-dimension data.

In one embodiment, the combination module 707 determines one or more matching signals from the set of second-dimension data for each digital signal included in the set of first-dimension data. For example, for a first digital signal included in the set of first-dimension data, the combination module 707 determines a matching signal as a second digital signal from the set of second-dimension data that has the same amplitude value as the first digital signal. In one embodiment, the combination module 707 selects a second digital signal from the set of second-dimension data whose amplitude is closest to the amplitude of the first digital signal as a matching signal for the first digital signal.

The combination module 707 determines a first location in the first dimension associated with the digital signal included in the set of first-dimension data. The combination module 707 also determines a second location in the second dimension associated with the matching signal included in the set of second-dimension data. The combination module 707 generates a data point for the set of two-dimensional data as a digital signal having the same amplitude as the matching signal and/or the digital signal included in the set of first-dimension data. A location for the data point in a two-dimensional domain is determined by the first location in the first dimension and the second location in the second dimension.

For example, assume that a first digital signal associated with a sensor signal $X_2$ is included in the set of first-dimension data. The first digital signal has an amplitude value $V_0$, where $V_0$ is a positive number. The combination module 707 determines a second digital signal included in the set of second-dimension data as a matching signal for the first digital signal, because the second digital signal has the same amplitude value $V_0$ as the first digital signal. The second digital signal is associated with a sensor signal $Y_5$. The combination module 707 determines a first location as the location "2" in the first dimension since the first digital signal is associated with the sensor signal $X_2$ in the first dimension. The combination module 707 also determines a second location as the location "5" in the second dimension since the matching signal is associated with the sensor signal $Y_5$ in the second dimension. The combination module 707 generates a data point that has an amplitude value $V_0$ at a two-dimensional location (2, 5) for the set of two-dimensional data.

By performing similar operations for each digital signal included in the set of first-dimension data, the combination module 707 determines one or more matching signals for each digital signal included in the set of first-dimension data and generates all the data points included in a set of two-dimensional data. Examples of a graphical representation of a set of two-dimensional data are shown in FIGS. 9C, 10C and 11C.

Power Unit

Figure 8:
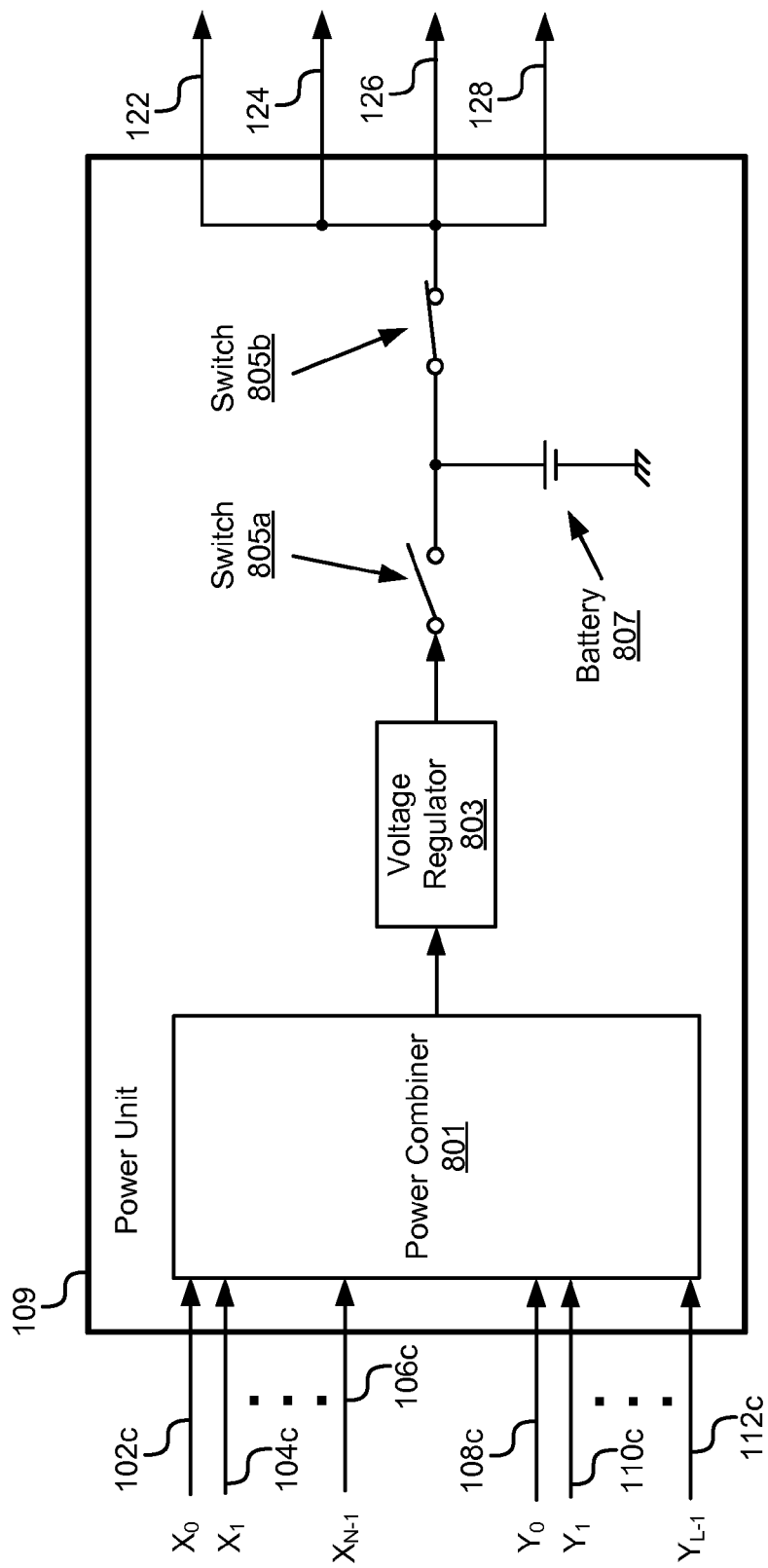
FIG. 8 is a block diagram illustrating a power unit according to one embodiment.

FIG. 8 is a block diagram illustrating a power unit 109 according to one embodiment. The power unit 109 comprises, among other things, a power combiner 801, a voltage regulator 803, a switch 805a, a switch 805b and a rechargeable battery 807.

The power combiner 801 is a device for combining one or more signals. For example, the power combiner 801 is an electronic circuit for combining sensor signals. In one embodiment, the power combiner 801 receives a first set of sensor signals $(X_0, X_1 \ldots X_{N-1})$ and a second set of sensor signals $(Y_0, Y_1 \ldots Y_{L-1})$ from the switch unit 103. The power combiner 801 combines the first set of sensor signals and the second set of sensor signals to generate a power signal. The power combiner 801 sends the power signal to the voltage regulator 803.

The voltage regulator 803 is a device for regulating a signal. For example, the voltage regulator 803 is an electronic circuit for regulating a power signal. In one embodiment, the voltage regulator 803 receives a power signal from the power combiner 801 and regulates the voltage of the power signal. The voltage regulator 803 determines whether the voltage of the regulated power signal is above a threshold. If the voltage is above the threshold, the voltage regulator 803 turns on the switch 805a and turns off the switch 805b so that the battery 807 is charged. If the voltage is below the threshold, the voltage regulator 803 turns off the switch 805a. In one embodiment, the threshold is set by an administrator of the system 100.

The switch 805a, 805b is a device for connecting a signal line to another signal line. For example, the switch 805a, 805b is a conventional switch known to one skilled in the art. When the switch 805a is turned on and the switch 805b is turned off, the battery 807 is charged. When the switch 805b is turned on and the switch 805a is turned off, the battery 807 supplies power to one or more of the switch unit 103 via the power supply channel 128, the conversion unit 105 via the power supply channel 122, the processing unit 107 via the power supply channel 124 and the application unit 111 via the power supply channel 126.

The battery 807 is a rechargeable battery. For example, the battery 807 is a super capacitor. In one embodiment, the battery 807 stores electricity generated by the sensor array 101. For example, the battery 807 is charged using a power signal combined from the first set of sensor signals $(X_0, X_1 \ldots X_{N-1})$ and the second set of sensor signals $(Y_0, Y_1 \ldots Y_{L-1})$ generated by the sensor array 101. In another embodiment, the battery 807 provides power to one or more of the switch unit 103, the conversion unit 105, the processing unit 107 and the application unit 111.

Graphical Representations

FIG. 9A is a graphical representation 900 illustrating a first set of digital signals associated with a first dimension according to one embodiment. The first set of digital signals is filtered by the filter module 703. The graphical representation 900 includes a horizontal axis representing a location in a first dimension (e.g., x-axis) and a vertical axis representing an amplitude of a digital signal. The selection module 705 selects a first digital signal having an amplitude value $V_0$ at a location "1" and a second digital signal having an amplitude value $V_0$ at a location "4" as a set of first-dimension data. The amplitude value $V_0$ is a value greater than zero. For example, the amplitude value $V_0$ is a value greater than a threshold 902. In one embodiment, the digital signal at the location "1" and the digital signal at the location "4" are selected because their amplitude value $V_0$ is above the threshold 902. In one embodiment, the threshold 902 is set by an administrator of the system 100. The location data associated with the set of first-dimension data is "1" and "4." The set of first-dimension data is listed below in Table 1.

TABLE 1

A set of first-dimension data shown in FIG. 9A

| | First Digital Signal | Second Digital Signal |
|---|---|---|
| Amplitude Value | $V_0$ | $V_0$ |
| Location in First Dimension | 1 | 4 |

FIG. 9B is a graphical representation 930 illustrating a second set of digital signals associated with a second dimension according to one embodiment. The second set of digital signals is filtered by the filter module 703. The graphical representation 930 includes a horizontal axis representing an amplitude of a digital signal and a vertical axis representing a location in a second dimension (e.g., y-axis). The selection module 705 selects a digital signal having an amplitude value $V_0$ at a location "2" as a set of second-dimension data. In one embodiment, the digital signal at the location "2" is selected because the amplitude value $V_0$ is above a threshold 932. In one embodiment, the threshold 932 is set by an administrator of the system 100. The location data associated with the set of second-dimension data is "2." The set of second-dimension data is listed below in Table 2.

TABLE 2

A set of second-dimension data shown in FIG. 9B

| | First Digital Signal |
|---|---|
| Amplitude Value | $V_0$ |
| Location in Second Dimension | 2 |

FIG. 9C is a graphical representation 950 illustrating a set of two-dimensional data according to one embodiment. The set of two-dimensional data is generated by the combination module 707 based at least in part on the set of first-dimension data shown in FIG. 9A and the set of second-dimension data shown in FIG. 9B. The graphical representation 950 includes a horizontal axis representing a location in a first dimension (e.g., x-axis) and a vertical axis representing a location in a second dimension (e.g., y-axis).

Referring to Table 1 and Table 2 listed above, the combination module 707 determines a matching signal for the first digital signal at the location "1" listed in Table 1 as the digital signal at the location "2" listed in Table 2, because both digital signals have the same amplitude value $V_0$. The combination module 707 therefore generates a data point 952 having an amplitude value $V_0$ at a two-dimensional location (1, 2). Next, the combination module 707 determines a matching signal for the second digital signal at the location "4" listed in Table 1 as the digital signal at the location "2" listed in Table 2, because they have the same amplitude value $V_0$. The combination module 707 therefore generates a data point 954 having an amplitude value $V_0$ at a two-dimensional location (4, 2). The set of two-dimensional data includes the data point 952 and the data point 954.

FIG. 10A is a graphical representation 1000 illustrating a first set of digital signals associated with a first dimension according to another embodiment. The first set of digital signals is filtered by the filter module 703. The selection module 705 selects a digital signal having an amplitude value $V_1$ at a location "1" and a digital signal having an amplitude value $V_0$ at a location "4" as a set of first-dimension data. In the illustrated embodiment, the amplitude value $V_1$ is greater than the amplitude value $V_0$. In one embodiment, the digital signal at the location "1" and the digital signal at the location "4" are selected because both the amplitude value $V_1$ and the amplitude value $V_0$ are greater than a threshold 1002. The location data associated with the set of first-dimension data is "1" and "4." The set of first-dimension data is listed below in Table 3.

TABLE 3

A set of first-dimension data shown in FIG. 10A

|  | First Digital Signal | Second Digital Signal |
| --- | --- | --- |
| Amplitude Value | $V_1$ | $V_0$ |
| Location in First Dimension | 1 | 4 |

FIG. 10B is a graphical representation 1030 illustrating a second set of digital signals associated with a second dimension according to another embodiment. The second set of digital signals is filtered by the filter module 703. The selection module 705 selects a digital signal having an amplitude value $V_1$ at a location "2" and a digital signal having an amplitude value $V_0$ at a location "5" as a set of second-dimension data. In one embodiment, the digital signal at the location "2" and the digital signal at the location "5" are selected because both the amplitude value $V_1$ and the amplitude value $V_0$ are greater than a threshold 1032. The location data associated with the set of second-dimension data is "2" and "5." The set of second-dimension data is listed below in Table 4.

TABLE 4

A set of second-dimension data shown in FIG. 10B

|  | First Digital Signal | Second Digital Signal |
| --- | --- | --- |
| Amplitude Value | $V_1$ | $V_0$ |
| Location in Second Dimension | 2 | 5 |

FIG. 10C is a graphical representation 1050 illustrating a set of two-dimensional data according to another embodiment. The set of two-dimensional data is generated by the combination module 707 based at least in part on the set of first-dimension data shown in FIG. 10A and the set of second-dimension data shown in FIG. 10B. Referring to Table 3 and Table 4 listed above, the combination module 707 determines a matching signal for the first digital signal at the location "1" listed in Table 3 as the digital signal at the location "2" listed in Table 4, because both digital signals have the same amplitude value $V_1$. The combination module 707 generates a data point 1054 having an amplitude value $V_1$ at a two-dimensional location (1, 2).

Next, the combination module 707 determines a matching signal for the second digital signal at the location "4" listed in Table 3 as the digital signal at the location "5" listed in Table 4, because both digital signals have the same amplitude value $V_0$. The combination module 707 generates a data point 1052 having an amplitude value $V_0$ at a two-dimensional location (4, 5). The set of two-dimensional data includes the data point 1054 and the data point 1052. The data point 1054 is filled with black color to indicate that the amplitude value $V_1$ for the data point 1054 is greater than the amplitude value $V_0$ for the data point 1052.

FIG. 11A is a graphical representation 1100 illustrating a first set of digital signals associated with a first dimension according to yet another embodiment. The first set of digital signals is filtered by the filter module 703. The selection module 705 selects a digital signal having an amplitude value $V_1$ at a location "4" and a digital signal having an amplitude value $V_0$ at a location "1" as a set of first-dimension data. In the illustrated embodiment, the amplitude value $V_1$ is greater than the amplitude value $V_0$. In one embodiment, the digital signal at the location "1" and the digital signal at the location "4" are selected because both the amplitude value $V_0$ and the amplitude value $V_1$ are greater than a threshold 1102. The location data associated with the set of first-dimension data is "1" and "4." The set of first-dimension data is listed below in Table 5.

TABLE 5

A set of first-dimension data shown in FIG. 11A

|  | First Digital Signal | Second Digital Signal |
| --- | --- | --- |
| Amplitude Value | $V_0$ | $V_1$ |
| Location in First Dimension | 1 | 4 |

FIG. 11B is a graphical representation 1130 illustrating a second set of digital signals associated with a second dimension according to yet another embodiment. The second set of digital signals is filtered by the filter module 703. The selection module 705 selects a digital signal having an amplitude value $V_1$ at a location "1" and a digital signal having an amplitude value $V_0$ at a location "5" as a set of second-dimension data. In one embodiment, the digital signal at the location "1" and the digital signal at the location "5" are selected because both the amplitude value $V_1$ and the amplitude value $V_0$ are greater than a threshold 1132. The location data associated with the set of second-dimension data is "1" and "5." The set of second-dimension data is listed below in Table 6.

TABLE 6

A set of second-dimension data shown in FIG. 11B

|  | First Digital Signal | Second Digital Signal |
| --- | --- | --- |
| Amplitude Value | $V_1$ | $V_0$ |
| Location in Second Dimension | 1 | 5 |

FIG. 11C is a graphical representation 1150 illustrating a set of two-dimensional data according to yet another embodiment. The set of two-dimensional data is generated by the combination module 707 based at least in part on the set of first-dimension data shown in FIG. 11A and the set of second-dimension data shown in FIG. 11B. Referring to Table 5 and Table 6 listed above, the combination module 707 determines a matching signal for the first digital signal at the location "1" listed in Table 5 as the digital signal at the location "5" listed in Table 6, because both digital signals have the same amplitude value $V_0$. The combination module 707 generates a data point 1152 having an amplitude value $V_0$ at a two-dimensional location (1, 5).

Next, the combination module 707 determines a matching signal for the second digital signal at the location "4" listed in Table 5 as the digital signal at the location "1" listed in Table 6, because both digital signals have the same amplitude value $V_1$. The combination module 707 generates a data point 1154 having an amplitude value $V_1$ at a two-dimensional location (4, 1). The set of two-dimensional data includes the data point 1152 and the data point 1154. The data point 1154 is filled with black color to indicate that the amplitude value $V_1$ for the data point 1154 is greater than the amplitude value $V_0$ for the data point 1152.

Methods

Referring now to FIGS. 12-15, various embodiments of the method of the specification will be described. FIG. 12 is a flowchart illustrating a method 1200 for processing sensor signals according to one embodiment. The sensor array 101 embedded in a seat detects 1202 one or more inputs applied to the seat. In one embodiment, the one or more inputs are one or more physical parameters (e.g., pressure, force, strain, etc.) applied to the seat. The sensor array 101 generates 1204 a first set of sensor signals measuring the one or more inputs in a first dimension (e.g., x-axis). The sensor array 101 generates 1206 a second set of sensor signals measuring the one or more inputs in a second dimension (e.g., y-axis). The sensor array 101 sends the first set of sensor signals and the second set of sensor signals to the switch unit 103. The switch unit 103 delivers the first set of sensor signals to the multiplexer 503a and the second set of sensor signals to the multiplexer 503b.

The multiplexer 503a converts 1208 the first set of sensor signals to a first signal stream. The converter 507a converts 1210 the first signal stream to a first set of digital signals. The multiplexer 503b converts 1212 the second set of sensor signals to a second signal stream. The converter 507b converts 1214 the second signal stream to a second set of digital signals. In one embodiment, steps 1208-1210 and steps 1212-1214 are performed in parallel.

The signal processing module 609 processes 1216 the first set of digital signals and the second set of digital signals to generate a set of two-dimensional data. For example, the filter module 703 filters the first set of digital signals and the second set of digital signals. The selection module 705 selects a set of first-dimension data from the first set of digital signals and a set of second-dimension data from the second set of digital signals. The combination module 707 combines the set of first-dimension data and the set of second-dimension data to generate the set of two-dimensional data. In one embodiment, the signal processing module 609 generates the set of two-dimensional data by performing steps 1402-1442 as described below with reference to FIGS. 14A-14C.

Figure 13A:
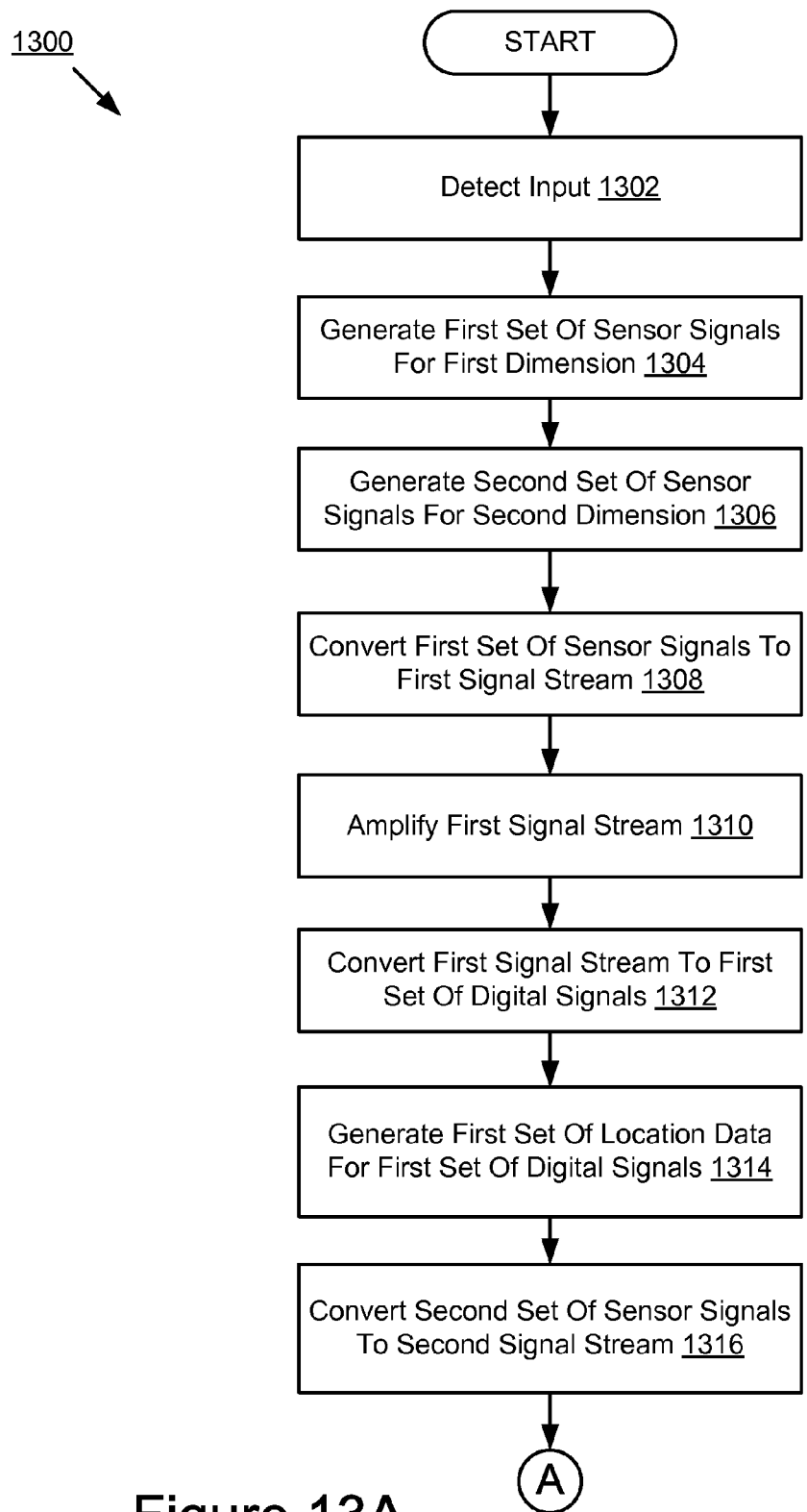
FIGS. 13A and 13B are flowcharts illustrating a method for processing sensor signals according to another embodiment.
Figure 13B:
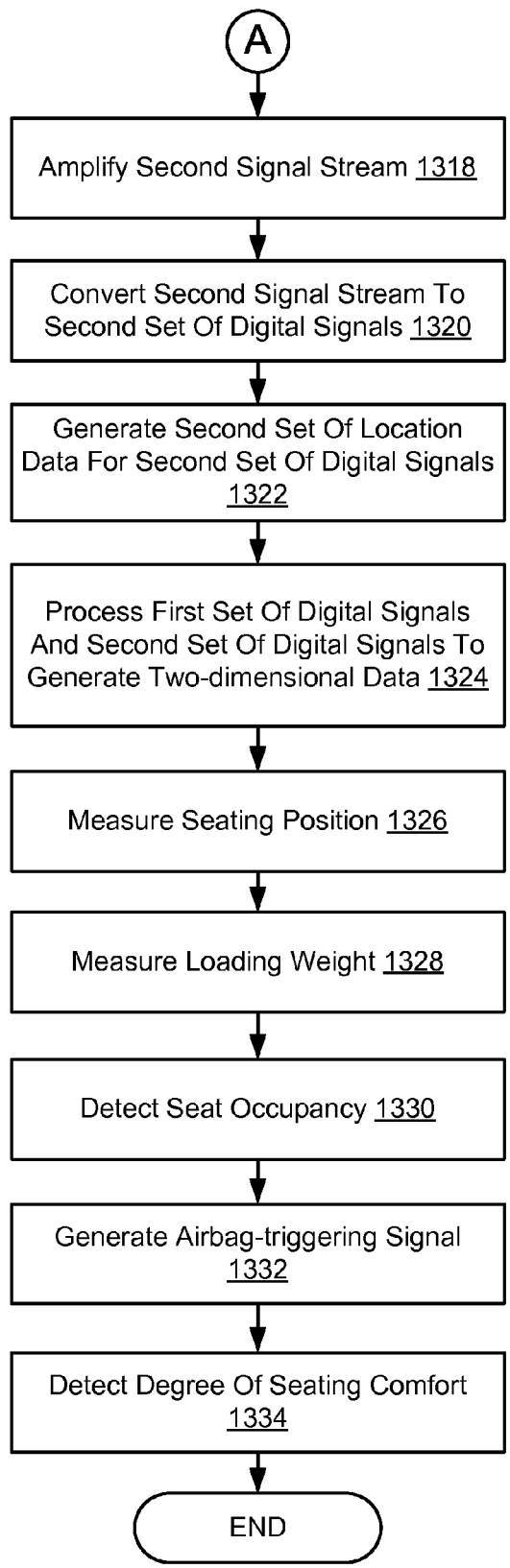

FIGS. 13A and 13B are flowcharts illustrating a method 1300 for processing sensor signals according to another embodiment. Referring to FIG. 13A, the sensor array 101 embedded in a seat detects 1302 one or more inputs applied to the seat. In one embodiment, the one or more inputs are one or more physical parameters (e.g., pressure, force, strain, etc.) applied to the seat. The sensor array 101 generates 1304 a first set of sensor signals measuring the one or more inputs in a first dimension (e.g., x-axis). The sensor array 101 generates 1306 a second set of sensor signals measuring the one or more inputs in a second dimension (e.g., y-axis). The sensor array 101 sends the first set of sensor signals and the second set of sensor signals to the switch unit 103. The switch unit 103 delivers the first set of sensor signals to the multiplexer 503a and the second set of sensor signals to the multiplexer 503b.

The multiplexer 503a converts 1308 the first set of sensor signals to a first signal stream. The amplifier 505a amplifies 1310 the first signal stream. The converter 507a converts 1312 the first signal stream to a first set of digital signals. The counter 509a generates 1314 a first set of location data associated with the first set of digital signals. The multiplexer 503b converts 1316 the second set of sensor signals to a second signal stream.

Referring to FIG. 13B, the amplifier 505b amplifies 1318 the second signal stream. The converter 507b converts 1320 the second signal stream to a second set of digital signals. The counter 509b generates 1322 a second set of location data associated with the second set of digital signals. In one embodiment, steps 1308-1314 and steps 1316-1322 are performed in parallel.

The signal processing module 609 processes 1324 the first set of digital signals and the second set of digital signals to generate a set of two-dimensional data. In one embodiment, the signal processing module 609 generates the set of two-dimensional data by performing steps 1402-1442 as described below with reference to FIGS. 14A-14C.

The application unit 111 measures 1326 a seating position based at least in part on the set of two-dimensional data. The application unit 111 measures 1328 a loading weight based at least in part on the set of two-dimensional data. In one embodiment, the application unit 111 detects 1330 a seat occupancy based at least in part on the seating position and the loading weight. In another embodiment, the application unit 111 generates 1332 an airbag-triggering signal based at least in part on the loading weight. The application unit 111 sends the airbag-triggering signal to the airbag deployment system 113. In yet another embodiment, the application unit 111 detects 1334 a degree of seating comfort based at least in part on the seating position and sends a signal representing the degree of seating comfort to the vehicle behavior control system 115.

Figure 14A:
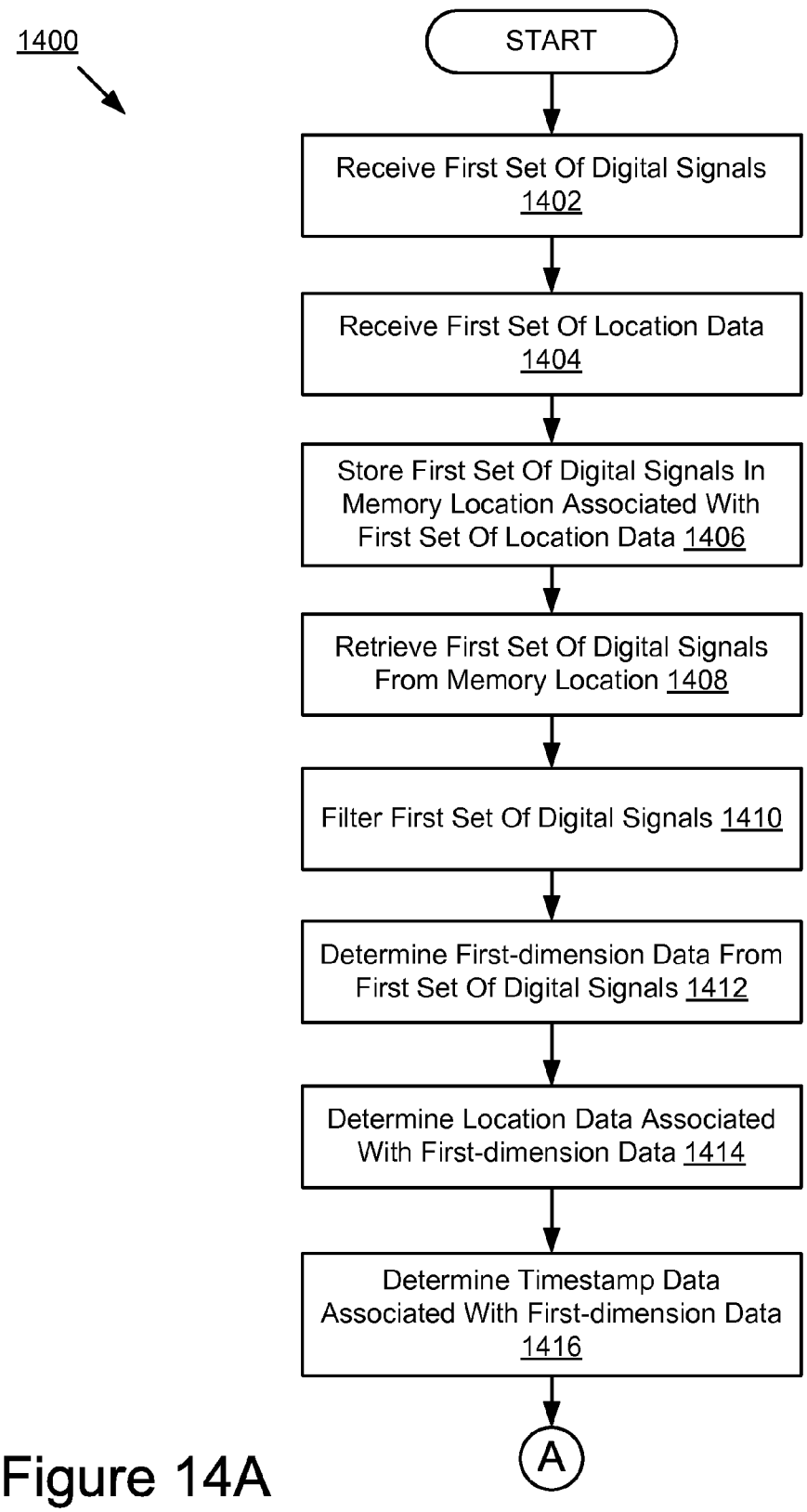
FIGS. 14A-14C are flowcharts illustrating a method for generating a set of two-dimensional data according to one embodiment.
Figure 14B:
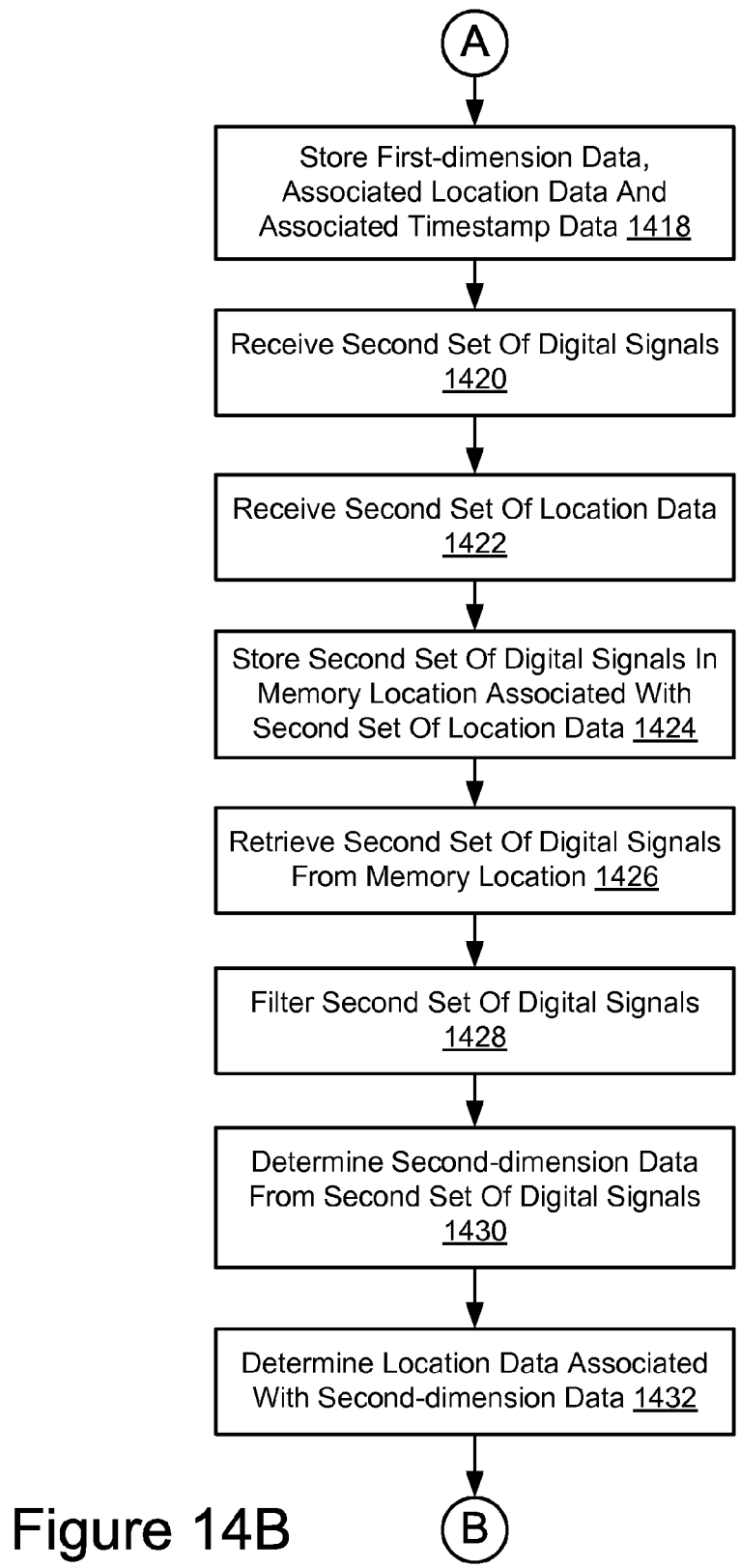
Figure 14C:
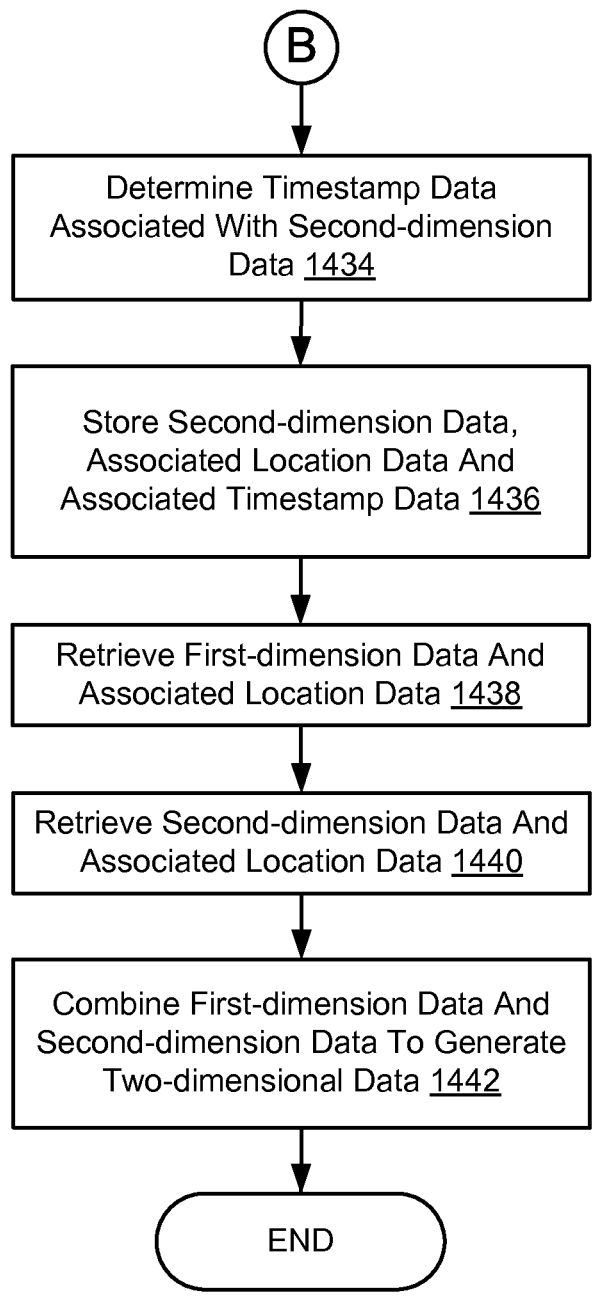

FIGS. 14A-14C are flowcharts illustrating a method 1400 for generating a set of two-dimensional data according to one embodiment. Referring to FIG. 14A, the communication module 701 receives 1402 a first set of digital signals from the converter 507a via signal line 114 and the data bus 603. The communication module 701 receives 1404 a first set of location data from the counter 509a via signal line 116 and the address bus 601. The communication module 701 stores 1406 the first set of digital signals in memory locations associated with the first set of location data.

The communication module 701 retrieves 1408 the first set of digital signals from the memory locations and sends the first set of digital signals to the filter module 703. The filter module 703 filters 1410 the first set of digital signals and sends the first set of digital signals after filtering to the selection module 705. The selection module 705 determines 1412 a set of first-dimension data from the first set of digital signals. The selection module 705 determines 1414 location data associated with the set of first-dimension data. The selection module 705 also determines 1416 timestamp data associated with the set of first-dimension data.

Referring to FIG. 14B, the selection module 705 stores 1418 the set of first-dimension data, location data and timestamp data associated with the set of first-dimension data in the memory 607. The communication module 701 receives 1420 a second set of digital signals from the converter 507b via signal line 120 and the data bus 603. The communication module 701 receives 1422 a second set of location data from the counter 509b via signal line 118 and the address bus 601. The communication module 701 stores 1424 the second set of digital signals in memory locations associated with the second set of location data.

The communication module 701 retrieves 1426 the second set of digital signals from the memory locations and sends the second set of digital signals to the filter module 703. The filter module 703 filters 1428 the second set of digital signals and sends the second set of digital signals after filtering to the selection module 705. The selection module 705 determines 1430 a set of second-dimension data from the second set of digital signals. The selection module 705 determines 1432 location data associated with the set of second-dimension data.

Referring to FIG. 14C, the selection module 705 determines 1434 timestamp data associated with the set of second-dimension data. The selection module 705 stores 1436 the set of second-dimension data, location data and timestamp data associated with the set of second-dimension data in the memory 607. In one embodiment, steps 1402-1418 and steps 1420-1436 are performed in parallel.

The communication module 701 retrieves 1438 the set of first-dimension data and the location data associated with the set of first-dimension data from the memory 607. The communication module 701 sends the set of first-dimension data and the associated location data to the combination module 707. The communication module 701 retrieves 1440 the set of second-dimension data and the location data associated with the set of second-dimension data from the memory 607. The communication module 701 sends the set of second-dimension data and the associated location data to the combination module 707. The combination module 707 combines 1442 the set of first-dimension data and the set of second-dimension data to generate a set of two-dimensional data.

Figure 15:
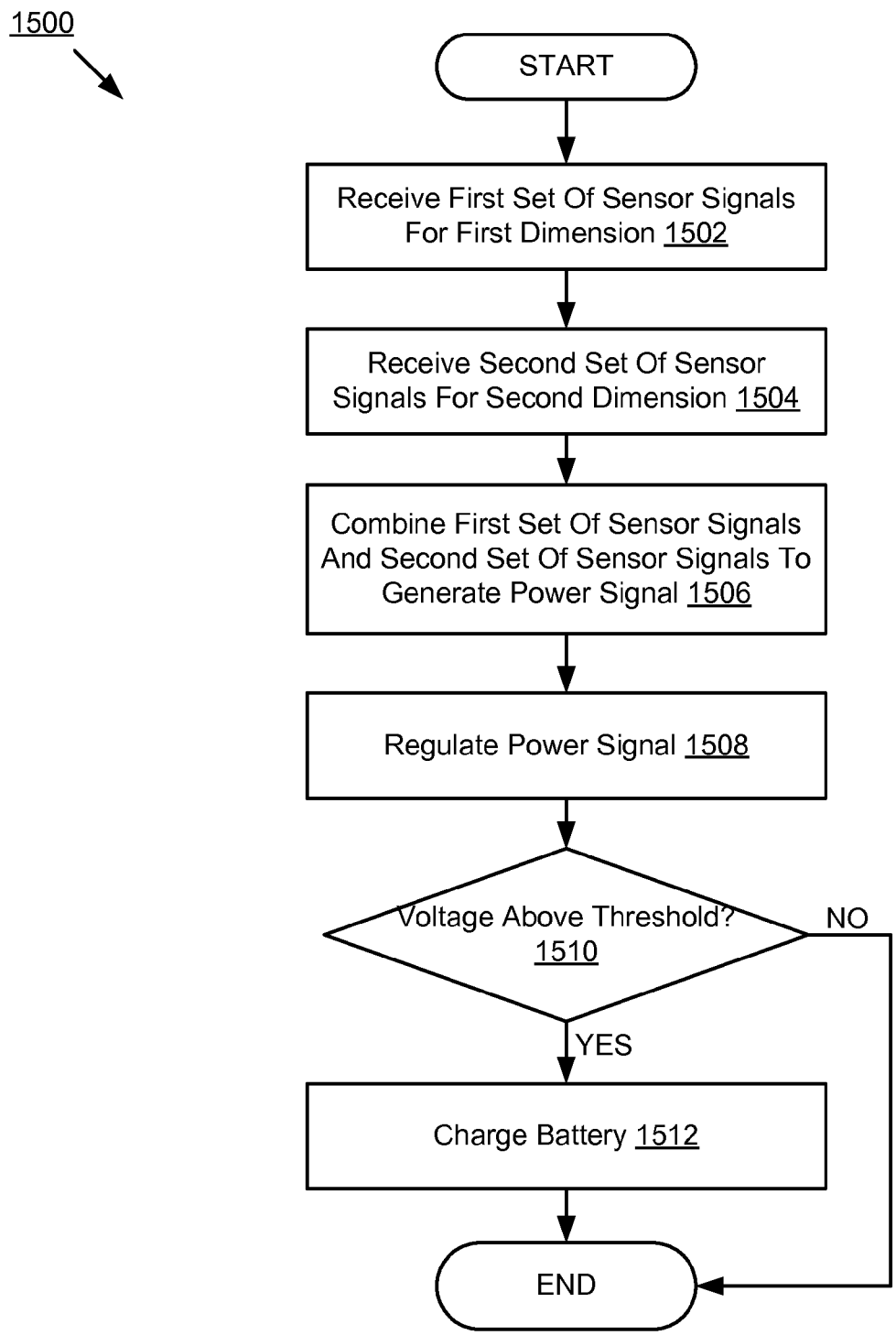
FIG. 15 is a flowchart illustrating a method for charging a battery according to one embodiment.

FIG. 15 is a flowchart illustrating a method 1500 for charging a battery according to one embodiment. The power combiner 801 receives 1502 a first set of sensor signals measuring one or more physical parameters (e.g., pressure, strain, etc.) in a first dimension (e.g., x-axis). The power combiner 801 receives 1504 a second set of sensor signals measuring the one or more physical parameters in a second dimension (e.g., y-axis). The power combiner 801 combines 1506 the first set of sensor signals and the second set of sensor signals to generate a power signal.

The voltage regulator 803 regulates 1508 the power signal. The voltage regulator 803 determines 1510 whether the voltage of the regulated power signal is above a threshold. If the voltage is above the threshold, the method 1500 moves to step 1512. Otherwise, the method 1500 ends. In one embodiment, the threshold is set by an administrator of the system 100. Turning to step 1512, the voltage regulator 803 charges the battery 807 by turning on the switch 805*a* and turning off the switch 805*b*.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for processing sensor signals, the method comprising:
    measuring, by one or more processors, one or more physical parameters in a first dimension on a seat and generating a first set of sensor signals for the first dimension;
    measuring, by the one or more processors, the one or more physical parameters in a second dimension on the seat and generating a second set of sensor signals for the second dimension;
    multiplexing, by the one or more processors, the first set of sensor signals into a first signal stream and the second set of sensor signals into a second signal stream;
    converting, by the one or more processors, the first signal stream to a first set of digital signals and the second signal stream to a second set of digital signals;
    determining, by the one or more processors, a set of first-dimension data from the first set of digital signals and a set of second-dimension data from the second set of digital signals;
    combining, by the one or more processors, the set of first-dimension data and the set of second-dimension data to form a set of two-dimensional data;
    generating, by the one or more processors and a counter, a first set of location data associated with the first set of digital signals;
    generating, by the one or more processors and the counter, a second set of location data associated with the second set of digital signals;
    determining, by the one or more processors, location data associated with the set of first-dimension data from the first set of location data; and
    determining, by the one or more processors, location data associated with the set of second-dimension data from the second set of location data.

2. The method of claim 1, wherein the set of two-dimensional data includes one or more data points representing one or more measurements for the one or more physical parameters in a two-dimensional domain comprising the first dimension and the second dimension.

3. The method of claim 1, wherein the set of two-dimensional data is formed based at least in part on the set of first-dimension data, the location data associated with the set of first-dimension data, the set of second-dimension data and the location data associated with the set of second-dimension data.

4. The method of claim 1 further comprising:
    combining, by the one or more processors, the first set of sensor signals and the second set of sensor signals to generate a power signal;
    regulating, by the one or more processors, the power signal;
    determining, by the one or more processors, whether a voltage of the power signal is above a threshold; and responsive to a determination that the voltage is above the threshold, charging, by the one or more processors, a battery based at least in part on the power signal.

5. The method of claim 1 further comprising:
measuring, by the one or more processors, a seating position and a loading weight on the seat based at least in part on the set of two-dimensional data;
generating, by the one or more processors, an airbag-triggering signal based at least in part on the loading weight;
detecting, by the one or more processors, a seat occupancy based at least in part on the seating position and the loading weight; and
measuring, by the one or more processors, a degree of seating comfort based at least in part on the seating position.

6. The method of claim 1, wherein determining the set of first-dimension data from the first set of digital signals and the set of second-dimension data from the second set of digital signals further comprising:
selecting, by the one or more processors, one or more first digital signals that have amplitudes greater than a threshold as the set of first-dimension data from the first set of digital signals; and
selecting, by the one or more processors, one or more second digital signals that have amplitudes greater than the threshold as the set of second-dimension data from the second set of digital signals.

7. A system for processing sensor signals, the system comprising:
a sensor array measuring one or more physical parameters in a first dimension on a seat and generating a first set of sensor signals for the first dimension, the sensor array measuring the one or more physical parameters in a second dimension on the seat and generating a second set of sensor signals for the second dimension;
a multiplexer communicatively coupled to the sensor array, the multiplexer multiplexing the first set of sensor signals into a first signal stream and the second set of sensor signals into a second signal stream;
a converter communicatively coupled to the multiplexer, the converter converting the first signal stream to a first set of digital signals and the second signal stream to a second set of digital signals;
a selection module communicatively coupled to the converter, the selection module determining a set of first-dimension data from the first set of digital signals and a set of second-dimension data from the second set of digital signals;
a combination module communicatively coupled to the selection module, the combination module combining the set of first-dimension data and the set of second-dimension data to form a set of two-dimensional data; and
a counter communicatively coupled to the multiplexer, the converter, the selection module and the combination module, the counter generating a first set of location data associated with the first set of digital signals, the counter generating a second set of location data associated with the second set of digital signals,
wherein the selection module is further configured to determine location data associated with the set of first-dimension data from the first set of location data and determine location data associated with the set of second-dimension data from the second set of location data.

8. The system of claim 7, wherein the set of two-dimensional data includes one or more data points representing one or more measurements for the one or more physical parameters in a two-dimensional domain comprising the first dimension and the second dimension.

9. The system of claim 7, wherein the set of two-dimensional data is formed based at least in part on the set of first-dimension data, the location data associated with the set of first-dimension data, the set of second-dimension data and the location data associated with the set of second-dimension data.

10. The system of claim 7 further comprising:
a power combiner communicatively coupled to the sensor array, the power combiner combining the first set of sensor signals and the second set of sensor signals to generate a power signal; and
a voltage regulator communicatively coupled to the power combiner, the voltage regulator regulating the power signal, the voltage regulator determining whether a voltage of the power signal is above a threshold, responsive to a determination that the voltage is above the threshold the voltage regulator charging a battery based at least in part on the power signal.

11. The system of claim 7 further comprising:
an application unit communicatively coupled to the combination module, the application unit measuring a seating position and a loading weight on the seat based at least in part on the set of two-dimensional data, the application unit generating an airbag-triggering signal based at least in part on the loading weight, the application unit detecting a seat occupancy based at least in part on the seating position and the loading weight, the application unit measuring a degree of seating comfort based at least in part on the seating position.

12. The system of claim 7, wherein the selection module is further configured to:
select one or more first digital signals that have amplitudes greater than a threshold as the set of first-dimension data from the first set of digital signals; and
select one or more second digital signals that have amplitudes greater than the threshold as the set of second-dimension data from the second set of digital signals.

13. A computer program product comprising a non-transitory computer readable medium encoding instructions that, in response to execution by a computing device, cause the computing device to perform operations comprising:
multiplexing a first set of sensor signals into a first signal stream and a second set of sensor signals into a second signal stream, the first set of sensor signals representing one or more measurements for one or more physical parameters in a first dimension on a seat, the second set of sensor signals representing one or more measurements for the one or more physical parameters in a second dimension on the seat;
converting the first signal stream to a first set of digital signals and the second signal stream to a second set of digital signals;
determining a set of first-dimension data from the first set of digital signals and a set of second-dimension data from the second set of digital signals;
combining the set of first-dimension data and the set of second-dimension data to form a set of two-dimensional data;
generating, by a counter, first set of location data associated with the first set of digital signals;
generating, by the counter, a second set of location data associated with the second set of digital signals;
determining location data associated with the set of first-dimension data from the first set of location data; and determining location data associated with the set of second-dimension data from the second set of location data.

14. The computer program product of claim 13, wherein the set of two-dimensional data includes one or more data points representing one or more measurements for the one or more physical parameters in a two-dimensional domain comprising the first dimension and the second dimension.

15. The computing program product of claim 13, wherein the set of two-dimensional data is formed based at least in part on the set of first-dimension data, the location data associated with the set of first-dimension data, the set of second-dimension data and the location data associated with the set of second-dimension data.

16. The computer program product of claim 13, wherein the instructions cause the computing device to perform operations further comprising:
    measuring a seating position and a loading weight on the seat based at least in part on the set of two-dimensional data;
    generating an airbag-triggering signal based at least in part on the loading weight;
    detecting a seat occupancy based at least in part on the seating position and the loading weight; and
    measuring a degree of seating comfort based at least in part on the seating position.

17. The computer program product of claim 13, wherein determining the set of first-dimension data from the first set of digital signals and the set of second-dimension data from the second set of digital signals further comprising:
    selecting one or more first digital signals that have amplitudes greater than a threshold as the set of first-dimension data from the first set of digital signals; and
    selecting one or more second digital signals that have amplitudes greater than the threshold as the set of second-dimension data from the second set of digital signals.

18. A system for processing sensor signals, the system comprising:
    a sensor array measuring one or more physical parameters in a first dimension on a seat and generating a first set of sensor signals for the first dimension, the sensor array measuring the one or more physical parameters in a second dimension on the seat and generating a second set of sensor signals for the second dimension;
    a multiplexer communicatively coupled to the sensor array, the multiplexer multiplexing the first set of sensor signals into a first signal stream and the second set of sensor signals into a second signal stream;
    a converter communicatively coupled to the multiplexer, the converter converting the first signal stream to a first set of digital signals and the second signal stream to a second set of digital signals;
    a selection module communicatively coupled to the converter, the selection module determining a set of first-dimension data from the first set of digital signals and a set of second-dimension data from the second set of digital signals;
    a combination module communicatively coupled to the selection module, the combination module combining the set of first-dimension data and the set of second-dimension data to form a set of two-dimensional data; and
    a counter communicatively coupled to the multiplexer, the converter, the selection module and the combination module, the counter generating a first set of location data associated with the first set of digital signals, the counter generating a second set of location data associated with the second set of digital signals, wherein
    the selection module is further configured to determine location data associated with the set of first-dimension data from the first set of location data and determine location data associated with the set of second-dimension data from the second set of location data, and
    the set of two-dimensional data includes one or more data points representing one or more measurements for the one or more physical parameters in a two-dimensional domain comprising the first dimension and the second dimension.

* * * * *